United States Patent
Niwa et al.

(10) Patent No.: US 8,314,778 B2
(45) Date of Patent: Nov. 20, 2012

(54) APPARATUS WITH SELECTABLE FUNCTIONS

(75) Inventors: Shinji Niwa, Nagoya (JP); Katsushi Asami, Nukata-gun (JP); Ichiro Akahori, Anjo (JP)

(73) Assignee: DENSO CORPORATION, Kariya (JP)

( * ) Notice: Subject to any disclaimer, the term of this patent is extended or adjusted under 35 U.S.C. 154(b) by 272 days.

(21) Appl. No.: 12/656,735

(22) Filed: Feb. 16, 2010

(65) Prior Publication Data

US 2010/0220070 A1 Sep. 2, 2010

(30) Foreign Application Priority Data

Feb. 27, 2009 (JP) .................................. 2009-46637

(51) Int. Cl.
*G06F 3/041* (2006.01)
(52) U.S. Cl. .................. 345/173; 345/179; 345/184
(58) Field of Classification Search .................. None
See application file for complete search history.

(56) References Cited

U.S. PATENT DOCUMENTS

| | | | | |
|---|---|---|---|---|
| 4,071,691 A * | 1/1978 | Pepper, Jr. | ............... | 178/18.05 |
| 4,812,716 A * | 3/1989 | Miyama et al. | ............... | 315/366 |
| 4,958,148 A * | 9/1990 | Olson | .................. | 345/174 |
| 5,861,875 A * | 1/1999 | Gerpheide | .................. | 345/174 |
| 6,025,726 A * | 2/2000 | Gershenfeld et al. | ......... | 324/671 |
| 6,628,263 B1 * | 9/2003 | Konuma et al. | ............... | 345/104 |
| 6,998,856 B2 * | 2/2006 | Sterling | .................. | 324/671 |
| 2002/0054261 A1 * | 5/2002 | Sekiguchi | .................. | 349/122 |
| 2002/0180712 A1 * | 12/2002 | Sato et al. | .................. | 345/173 |
| 2003/0098858 A1 * | 5/2003 | Perski et al. | .................. | 345/173 |
| 2005/0146336 A1 * | 7/2005 | Kimura et al. | .................. | 324/538 |
| 2006/0281363 A1 * | 12/2006 | Trezza | .................. | 439/502 |
| 2008/0036743 A1 * | 2/2008 | Westerman et al. | ......... | 345/173 |
| 2008/0129621 A1 | 6/2008 | Koshiji | | |
| 2008/0284750 A1 * | 11/2008 | Hsu et al. | .................. | 345/173 |
| 2011/0007035 A1 * | 1/2011 | Shai | .................. | 345/179 |
| 2011/0210931 A1 | 9/2011 | Shai | | |

FOREIGN PATENT DOCUMENTS

| | | |
|---|---|---|
| JP | A-9-218746 | 8/1997 |
| JP | A-2000-148396 | 5/2000 |
| JP | A-2001-184167 | 7/2001 |
| JP | A-2002-41206 | 2/2002 |
| JP | A-2008-33408 | 2/2008 |
| JP | 2009-46635 | 2/2009 |

(Continued)

OTHER PUBLICATIONS

Examination report mailed Jul. 26, 2011 in the corresponding Chinese application No. 201010124488.0 (and English translation).

(Continued)

*Primary Examiner* — Amare Mengistu
*Assistant Examiner* — Antonio Xavier
(74) *Attorney, Agent, or Firm* — Posz Law Group, PLC

(57) ABSTRACT

A user can wear a transmitter module on a finger. The transmitter module transmits an electric signal through a finger. An electronic device includes a touch panel as an input device and a conductive film. The conductive film is a part of a receiver module which receives the electric signal when the body part is approached to the conductive film. The control unit provides a performing module which selectively performs one function among the functions according to the detection result of the receiver module. A first function is performed when the user approaches a finger wearing the transmitter module. A second function is performed when the user approaches another finger not wearing the transmitter module.

12 Claims, 15 Drawing Sheets

FOREIGN PATENT DOCUMENTS

| | | |
|---|---|---|
| JP | 2009-134040 | 6/2009 |
| JP | 2009-214758 | 9/2009 |
| JP | A-2010-537302 | 12/2010 |

OTHER PUBLICATIONS

Office Action mailed Jan. 11, 2011 in corresponding JP Application No. 2009-046637 (and English Translation).

U.S. Appl. No. 12/656,661, filed Feb. 12, 2010, Noda et al.

U.S. Appl. No. 12/656,662, filed Feb. 12, 2010, Asami et al.

Office Action mailed Jan. 11, 2011 issued in corresponding JP patent application No. 2009-46637 (English translation enclosed).

Office Action dated Mar. 12, 2012 issued in corresponding CN patent application No. 201010124488.0 (English translation attached).

Decision of Rejection dated Aug. 31, 2012 in corresponding CN Patent Application No. 201010124488.0 (and English translation).

* cited by examiner

APPARATUS WITH SELECTABLE FUNCTIONS

CROSS REFERENCE TO RELATED APPLICATION

This application is based on Japanese Patent Application No. 2009-46637 filed on Feb. 27, 2009, the contents of which are incorporated herein by reference in its entirety.

FIELD OF THE INVENTION

The present invention relates to an apparatus with selectable functions. The apparatus has a user interface device which inputs operation of a user as, a command for functions. The apparatus may be an electronic device or an information processing system which perform various processing for functions in response to an operation of the user.

BACKGROUND OF THE INVENTION

Conventionally, various electronic devices which perform predetermined function in response to an operation of the user are known in the technical field. For example, an electronic device inputs an operation signal from an input device which includes a plurality of operational keys, and performs one of functions according to the operation input from the user. Alternatively, an electronic device may include a graphical user interface device which includes a display device for displaying an operation screen image and a pointing device for inputting an operation signal. In this case, the electronic device performs one of functions according to the operation input of the user inputted based on the operation screen image.

A touch panel is known as an input device. The touch panel detects a touching motion of a user and locates a position of the touching motion on the touch surface. Then, touch panel inputs the operation signal which is coordinates of the position of the touching motion. Generally, the touch panel includes a transparent sheet and is disposed on a display screen of a display device.

In addition, the following patent document 1 discloses an input device using a touch panel. In this device, the device identifies a user who touches the touch panel. The device applies an electric signal on a contact surface to the user and detects a touching operation by the electric signal which flows through a user's body when the user touches the contact surface.

In addition, the following patent document 2 discloses an electronic device for drawing which has a display device with a touch panel. The device includes color selection keys. If one of the color selection keys is touched, the device enables the user to use the color corresponding to touched color selection key. Then, the electronic device controls a display device to display a drawing by using an enabled color for the user. The drawing is drawn with a user's finger on a drawing area defined on the touch panel.

PATENT DOCUMENTS

1: JP2000-148396A
2: JP2002-041206A

SUMMARY OF THE INVENTION

In recent years, the number of functions installed in an electronic device is increasing. As the number of functions increases, there is a problem in which an operability of the electronic device is lowered.

For example, in a case that the electronic device uses an input device provided with mechanical operation keys, the number of operation keys must be increased as the number of functions installed in the electronic device increases. Therefore, because of increased number of keys, it becomes difficult to locate the target operation key for a user. As a result, operability is lowered. In addition, it is necessary to reduce a size of an operation key, because many keys must be arranged on a limited area. Therefore, it becomes difficult to press a key for a user.

In a case that a user interface is provided by a combination of a graphical user interface and a pointing device, such as a mouse or a touch panel, a display area of the display device is also limited. Therefore, it is necessary to configure the graphical user interface to display a plurality of operation screen images in a hierarchical manner.

However, in the above case using the hierarchical images, a user must carries out multiple-times of operations to switch the operation screen images to find a target input object. As a result, operability is also lowered. In addition, it is necessary to display, on the upper operation screen image, an input object for calling a lower layer operation screen image. Therefore, there is a problem that the number of the substantial input objects which can be displayed on per image is reduced.

In addition, in a case of the electronic device for drawing, the user merely enabled to use only one color. If a user wants to draw a colorful drawing, the user must frequently operate different color selection keys to change the color enabled. As a result, operability is also lowered.

The present invention is made in view of the above-mentioned problem.

It is an object of the present invention to provide an apparatus with selectable functions with improved operability.

It is another object of the present invention to provide a user interface device for selecting functions which is easy to use.

It is still another object of the present invention to provide an electronic device and/or an information processing system which is easy to use.

In one aspect of the present invention, the present invention provides an apparatus with selectable functions. The apparatus may be an electronic device or an information processing system including the electronic device as a component. The apparatus is operated by a user who wears a wearable transmitter module. For example, the transmitter module is wearable on a user's body part, such as a finger, a hand, an arm and so on. The transmitter module may be configured to supply an electric signal through the body part. The electronic device and the transmitter module may provide the information processing system.

The electronic device includes an input device capable of being operated by the user, a performing module which performs a function corresponding to an operation signal supplied from the input device, and a receiver module. The input device is capable of being operated by a user to input an operation signal. The receiver module includes an electric conductor for receiving an electric signal, by a direct contact or an electric coupling, from a body part of a user who wears the transmitter module which transmits an electric signal through the body part. The receiver module detects a contact or proximity of an electric conductor with the body part of the user based on the signal received by the electric conductor.

The performing module is configured to be able to perform a plurality of functions corresponding to the operation signal supplied from the input device, and selectively performs the functions according to the detection result of the receiver module. The performing module may be configured as a processing means for executing a predetermined processing for providing a function among a plurality of processing for different functions. The plurality of processing are prepared for providing functions which are expected to be provided in response to the operation signal supplied from the input device. The performing module selects one processing according to the detection result of the receiver module.

The scope of the present invention is not limited by types of the input devices. Many types of the input devices can be used for the apparatus. For example, it is possible to use an input device which is configured to detect a touching motion of a user to a touch surface, to locate coordinates of a position where the touching motion is detected on the touch surface, and to supply the coordinates into the performing module as the operation signal. Alternatively, it is possible to use an input device which includes a plurality of mechanical operable members, such as keys, and inputs an operation signal indicative of the operable member which is actually operated.

In the above configuration, a plurality of functions are prepared for one operation signal. The performing module selectively performs the plurality of functions according to the detection result of the receiver module. The user has a specific body part through which the electric signal from the transmitter module flows to the electric conductor when the body part is placed in contact with the electric conductor or is placed proximate to the electric conductor. Therefore, the user can control the detection result of the receiver module by selectively placing his or her body part in two positions. One position is a position in contact with or proximate to the electric conductor. The other one position is a position distanced from or far away from the electric conductor. The user can operate the input device while selectively placing the specific body part in those two positions. Therefore, the user can make the electronic device to perform the functions selectively in response to the same operation on the input device by moving the specific body part with respect to the electric conductor. According to the electronic device, it is not necessary to dispose too many keys on the input device. In a case that the input device is provided by a user interface device provided by a combination of a pointing device, such as a touch panel, and a graphical user interface, it is possible to reduce the number of hierarchical images, and to provide a simple operating system on the electronic device. According to the above configuration, it is possible to prevent lowering of operability and to provide a useful electronic device and information process system.

The input device may be configured to detect a touching motion of a user to a touch surface, to locate coordinates of a position where the touching motion is detected on the touch surface, and to supply the coordinates into the performing module as the operation signal. In this case, the performing module may be configured to be able to perform a plurality of functions corresponding to the coordinates supplied from the input device. In addition, the performing module may be configured, in response to a supply of the coordinates from the input device by detecting the touching motion, to selectively perform one function according to the detection result of the receiver module. The performing module is configured to select one function from the functions which are prepared associated with and corresponding to the coordinates.

The input device may include at least one mechanical operable member, and supplies the operation signal indicative of the operable member which is actually operated into the performing module. In this case, the performing module may be configured to be able to perform a plurality of functions corresponding to the operable member on the input device. In addition, the performing module may be configured, in response to a supply of the operation signal from the input device caused by operating the operable member, selectively performs one function according to the detection result of the receiver module. The performing module is configured to select one function from the functions corresponding to the operable member actually operated.

The input device may be provided by a pointing device, such as a touch panel. In addition, the electronic device may be configured to input the operation of the user by a user interface device provided by a combination of the pointing device and a graphical user interface.

In this case, the electric device may include a display device for the graphical user interface. The performing module may be configured to change operation screen images displayed on the display device according to the detection result of the receiver module. In addition, the performing module may be configured to selectively perform one function according to the detection result of the receiver module by performing the function corresponding to a user's operation information which is indicated by the operation screen image displayed on the display device and is determined based on the operation signal inputted from the input device. According to the above configuration, the user can change the operation screen images by just moving and relocating the specific body part.

Therefore, it is not necessary to dispose, on the operation screen image, an input object for switching the operation screen images. It is not necessary to let the user to carry out a complicated switching operation for the operation screen images through the input device. Therefore, it is possible to improve operability, even if user's operations are inputted through a plurality of operation screen images.

The electric conductor of the receiver module may be provided as a conductive film on a surface of the input device. The input device may be configured to detect a touching motion of a user to a touch surface, to locate coordinates of a position where the touching motion is detected on the touch surface, and to supply the coordinates into the performing module as the operation signal. In this case, the electric conductor may be provided as the conductive film placed on the touch surface. According to the above configuration, the user who wears the transmitter module on his or her finger or arm can select and switch the functions to be performed by the electronic device by operating the input device by different fingers or arms. Therefore, a plurality of functions with which an electronic device is provided can be used by easy operation.

In a case that the electronic device is a portable device, the electric conductor may be disposed on a part which is come in contact with a palm of the user when the user holds the electric device. According to the configuration, the user can select and switch the functions performed by the electronic device by just changing hands holding the electronic device. The transmitter module may be worn on one of arms. It is possible to use a plurality of functions on the electronic device by an easy operation.

The user may wear and equip with a plurality of transmitter modules, and may operate the electronic device in this condition. In this case, the electronic device is configured to distinguish and identify each one of the plurality of transmitter modules each of which are capable of transmitting distinguishable signals. In this case, the electronic device and the plurality of transmitter modules each of which outputs unique electric signal provides a system which may be called as an information processing system or an user interface system for a multi-function device. In the electronic device, the receiver module and the performing module may be formed in the following manner.

The receiver module may be configured to detect a contact or proximity of an electric conductor with each one of body parts of the user who wears a plurality of transmitter modules each of which transmits a unique electric signal through the body parts. The performing module may be configured to selectively perform the functions according to the detection result indicative of each one of the transmitter modules. For example, the user may wear the transmitter modules on different body parts which can be selectively approached to the electric conductor on the electronic device. The user may wear a first transmitter module on the pointing finger, and a second transmitter module on the middle finger. The user may wear a first transmitter module on the right arm, and a second transmitter module on the left arm. According to the configuration, it is possible to prepare a plurality of functions corresponding to one operation signal, and to selectively perform the functions. Therefore, it is possible to reduce the number of the operable members, such as keys, on the input device, or the number of input objects displayed on the operation screen image.

The performing module may be configured to selectively perform one function according to a detection order of the transmitter modules which are detected by the receiving module as the contact or the proximity. In this case, the one function is selected from the functions corresponding to the operation signal supplied from the input device. According to the configuration, the user can select and switch the functions performed by the electronic device by just approaching the body parts in different orders to the electric conductor. Therefore, a designer can design a multi-functions electronic device with reduced number of input selection member, such as keys on the input device. It is possible to improve operability of the electronic device.

The performing module may be configured to selectively perform one function according to a combination of the transmitter modules which are simultaneously detected by the receiving module as the contact or the proximity at a time of supply of the operation signal from the input device. According to the configuration, the user can select and switch the functions by just changing a combination of the body parts approached to the electric conductor on the electronic device. The combination includes a condition in which at least two transmitter modules are approached to the electric conductor simultaneously. Also, the combination includes a condition in which only one of transmitter modules is approached to the electric conductor and the other one is kept away from the electric conductor. Therefore, a designer can increase the number of functions in the electronic device while preventing lowering of operability of the user.

The electric device may further include a setting module which changes a relationship between the function which should be performed corresponding to the operation signal supplied from the input device and the detection result of the receiving module according to an instruction from the user. According to the configuration, the relationship between the functions and the detection result can be changed according to a user's instruction. Therefore, the user can build the operating system-optimal for him or her by adjusting the relationship.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

Hereinafter, embodiments of the present invention are described in detail by referring drawings. In the following description and drawings, the same reference numbers and symbols are given to components and parts which are the same or similar to that already described in the preceding embodiments. The preceding description may be referenced for the components and parts denoted by the same reference numbers and symbols. Hereinafter, differences from the preceding embodiments are mainly explained in the following embodiments. Other configurations are similar to or the same as that of the preceding embodiments, therefore, unless it is apparent, it is possible to achieve similar or the same functions and advantages as described in the preceding embodiments.

First Embodiment

Figure 1:
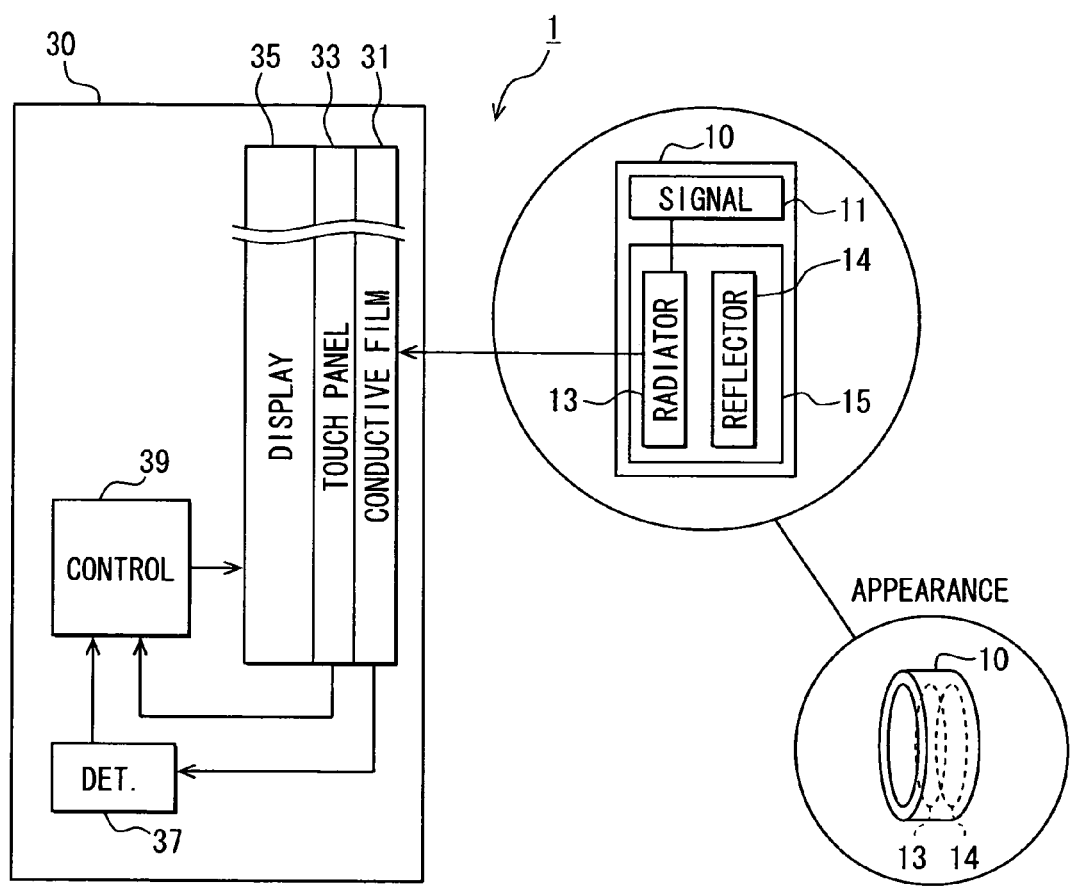
FIG. 1 is a block diagram showing an information processing system including a user interface device according to a first embodiment of a present invention.

FIG. 1 is a block diagram showing an information processing system 1 including a user interface device. The information processing system 1 includes a transmitter module 10 and, an electronic device 30. The transmitter module 10 is formed in a wearable form, such as a ring. The transmitter module 10 may be referred to as a ring 10. The ring 10 outputs and supplies an electric signal to a body part on which the ring 10 is equipped. The electronic device 30 is operated by the user who wears the ring 10.

The ring 10 supplies the electric signal to the body part of the user by using an electric field. The electric signal is a weak radio wave. The ring 10 includes a transmitter circuit 11 and an antenna 15.

The antenna 15 is supplied with electric power from the transmitter circuit 11. The antenna 15 includes a radiator 13 for radiating the electric signal to the body part, and a reflector 14 which reflects the electric signal supplied from the radiator 13 to the body part toward a distal end part of the body part. The transmitter circuit 11 is configured to supply a signal with specific frequency to the radiator 13.

That is, the radiator 13 outputs the electric signal, i.e., an electric wave, with the specific frequency to the body part according to the signal supplied from the transmitter circuit 11. The electric signal outputted from the radiator 13 is reflected by the reflector 14 and is transmitted through the body part in a specific direction.

The ring 10 is formed in a shape to be worn on a finger of a user. The radiator 13 and the reflector 14 are also formed in a ring shape and are disposed in the ring 10 in a parallel form with a predetermined axial distance. Therefore, the ring 10 is configured so that the electric signal outputted from the radiator 13 is reflected by the reflector 14, and is transmitted in a direction from the reflector 14 to the radiator 13 through the body part.

Figure 2A:
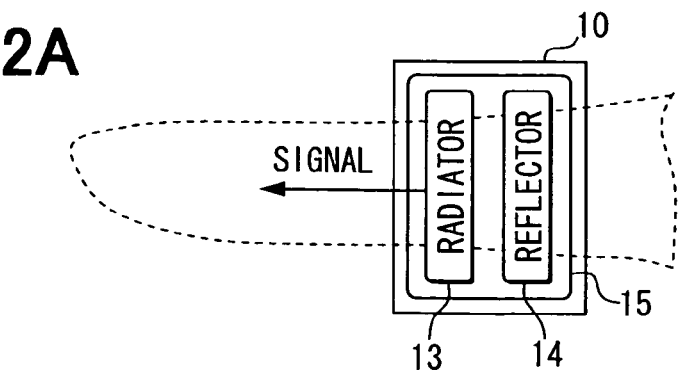
FIG. 2A is a block diagram showing a transmitter module wearable as a ring.

The ring 10 is formed to be worn on a finger such that the reflector 14 is arranged on a root side of a finger rather than the radiator 13. When the ring 10 is worn on a finger in the predetermined proper direction, as shown in FIG. 2A, the electric signal from the ring 10 is transmitted through the body part on a distal end side rather than a wearing part. FIG. 2A is a block diagram showing the ring 10 and the predetermined right wearing position.

That is, the ring 10 has directivity for transmitting the electric signal. Therefore, the ring 10 is configured so that the electric signal from the antenna 15 could not be transmitted from body part other than the finger equipped with the ring 10 to an external space. The electronic device 30 receives the electric signal which is supplied to the body part of the user from the ring 10. The electronic device 30 determines whether the user touches a touch panel with the finger equipped with the ring 10 or not by determining whether the electric signal is received or not. The electronic device 30 selects one function to be performed according to the determination result. In other word, the electronic device 30 distinguishes that the device is touched with a finger with the ring 10 or a finger without the ring 10. The electronic device 30 is configured to perform a plurality of functions which are prepared and predetermined to be performed in response to a certain operation signal supplied from an input device. The electronic device 30 selects one function from the functions installed. This selection is carried out according to the determination result of receiving of the electric signal. In a simple case, the electronic device 30 performs a first function when a touch panel is operated with a body part with the ring 10. The electronic device 30 performs a second function, which is different from the first function, when the touch panel is operated with a body part without the ring 10.

As shown in FIG. 1, the electronic device 30 includes a conductive film 31, a touch panel 33, a display device 35, a signal detector 37, and a control unit 39. The conductive film 31 is an electric conductor made of conductive thin film material. The touch panel 33 has a front surface on which the conductive film 31 is disposed. The touch panel 33 is disposed on a front side of the display device 35. The signal detector 37 is connected with the conductive film 31 to input the electric signal through the conductive film 31. The control unit 39 inputs signals from the touch panel 33 and the signal detector 37 and controls the display device 35.

The touch panel 33 has a touch surface covered with the conductive film 31. The touch panel 33 is configured to detect a touching motion of a user onto the touch surface. The touch panel 33 is configured to locate coordinates of a position on the touch surface where the touching motion is performed, and generates signal indicative of the coordinates located. The touch panel 33 is configured to output the coordinates and supplies the coordinates as an operation signal into the control unit 39. The touch panel 33 provides an input device capable of being operated by a user to input an operation signal. The display device 35 has a known configuration, such as a liquid crystal display. The display device 35 displays various information on the display surface which is covered with the touch panel 33. Images displayed on the display device 35 are controlled by the control unit 39.

The signal detector 37 determines whether the electric signal from the ring 10 is received or not based on the signal from the conductive film 31. In other words, the signal detector 37 detects a contact or proximity of an electric conductor with a body part equipped with the ring 10 based on the signal received by the conductor film 31. The conductor film 31 and the signal detector 37 provide a receiver module. The conductor film 31 is an electric conductor for receiving, by a direct contact or an electric coupling, an electric signal from a body part of a user who wears a transmitter module which transmits an electric signal through the body part. The signal detector 37 provides a component which detects a contact or proximity of the electric conductor with the body part of the user based on the signal received by the electric conductor. If the signal detector 37 receives an electric signal with specific frequency in more than certain signal strength through the conductive film 31, the signal detector 37 generates a YES signal which indicates that the electric signal is received. Then, the signal detector 37 transmits the YES signal to the control unit 39. If the signal detector 37 does not receive an electric signal with specific frequency in more than certain signal strength, the signal detector 37 generates a NO signal which indicates that the electric signal is not received. Then, the signal detector 37 transmits the NO signal to the control unit 39. The YES signal and NO signal may be referred to as a condition signal indicative of receiving condition of the electric signal of the ring 10. The condition signal also shows a detection result of the receiver module. As a result, the signal detector 37 determines whether the electric signal from the ring 10 is received through the conductive film 31 or not, and transmits the detection result to the control unit 39.

Figure 2B:
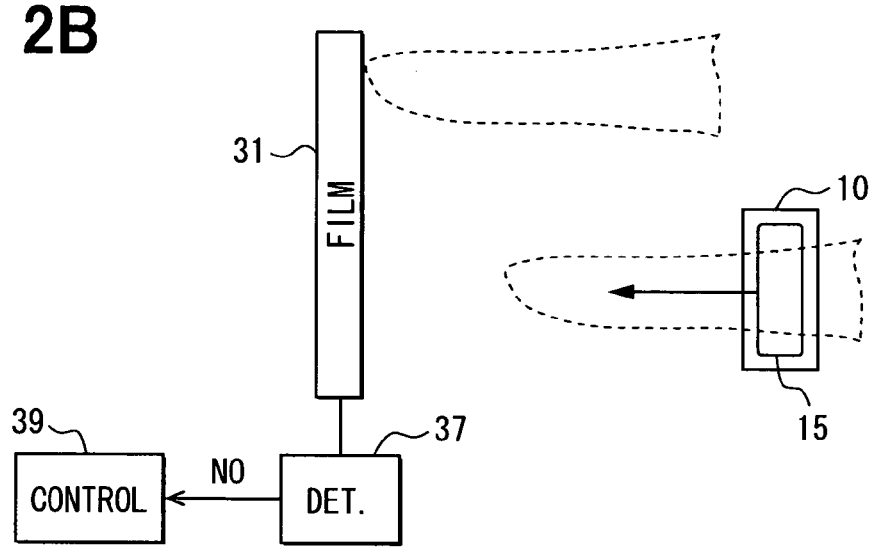
FIG. 2B is a block diagram showing components for detecting a signal from the transmitter module.
Figure 2C:
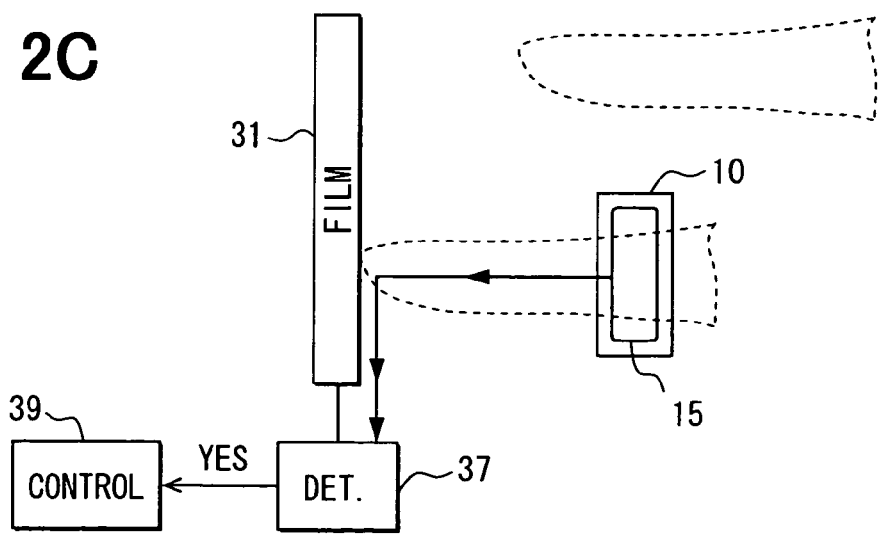
FIG. 2C is a block diagram showing components for detecting a signal from the transmitter module.

FIG. 2B is a block diagram showing components for detecting a signal from the ring 10. FIG. 2B shows a state in which the touch panel 33 is operated by a finger without the ring 10. FIG. 2C is a block diagram showing components for detecting a signal from the ring 10. FIG. 2C shows a state in which the touch panel 33 is operated by a finger with the ring 10. Transmitting path of the electric signal is illustrated by arrow symbols.

As shown in FIG. 2B, when a user operates the touch panel 33 with a finger without the ring 10, a finger with the ring 10 is placed away from the conductive film 31. In this case, the electric signal from the ring 10 can not be directly transmitted to the conductive film 31. A capacitive coupling is ignored in this embodiment. As a result, the signal detector 37 outputs the NO signal to the control unit 39.

As shown in FIG. 2C, when a user operates the touch panel 33 with a finger with the ring 10, a finger with the ring 10 is placed directly on or very close to the conductive film 31. In this case, the electric signal from the ring 10 can be directly transmitted to the conductive film 31. As a result, the signal detector 37 outputs the YES signal to the control unit 39.

The control unit 39 determines that whether a user is operating the touch panel 33 by a finger with the ring 10 or not based on the condition signal supplied from the signal detector 37. Then, the control unit 39 selects and switches functions according to the determination. In other words, the control unit 39 provides a performing module which is configured to be able to perform a plurality of functions corresponding to the operation signal supplied from the input device, and selectively performs the functions according to the detection result of the receiver module.

Figure 3:
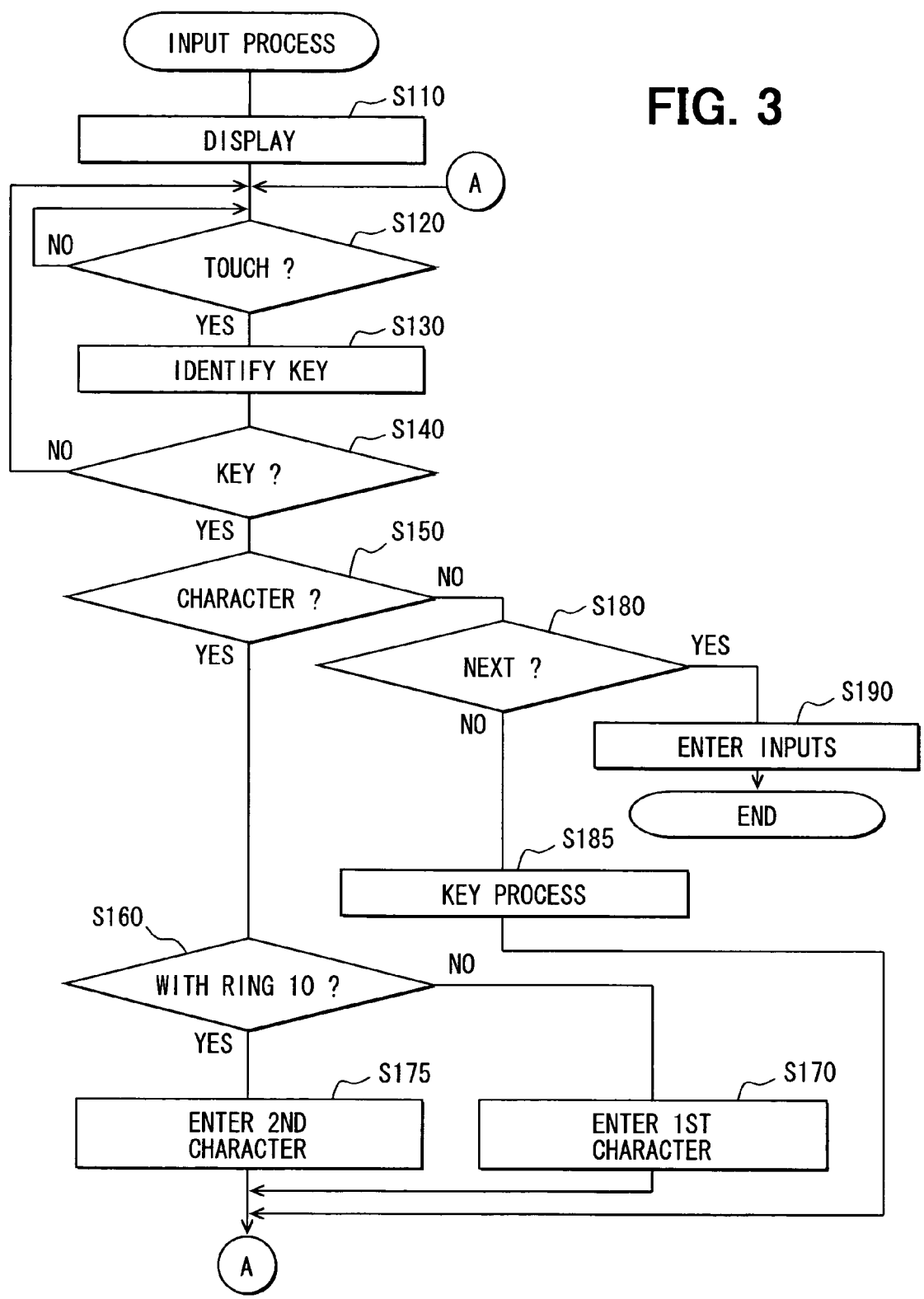
FIG. 3 is a flow chart showing character input processing performed by the information processing system.

The functions performed by the control unit 39 are explained referring to the attached drawings. FIG. 3 is a flow chart showing character input processing performed by the control unit 39. In the following description, steps in flow charts are referenced by symbol "S" and numbers. The control unit 39 performs the character input processing to retrieve character information from a user.

In a case that the electronic device 30 is a car navigation device, the character input processing is performed by the control unit 39 to retrieve information about a name of shop or an address as a destination for searching a route. In a case that the electronic device 30 is a music player with a hard disc drive storage, the character input processing is performed by the control unit 39 to retrieve information about a title of music to be stored in the hard disc drive storage.

Figure 4:
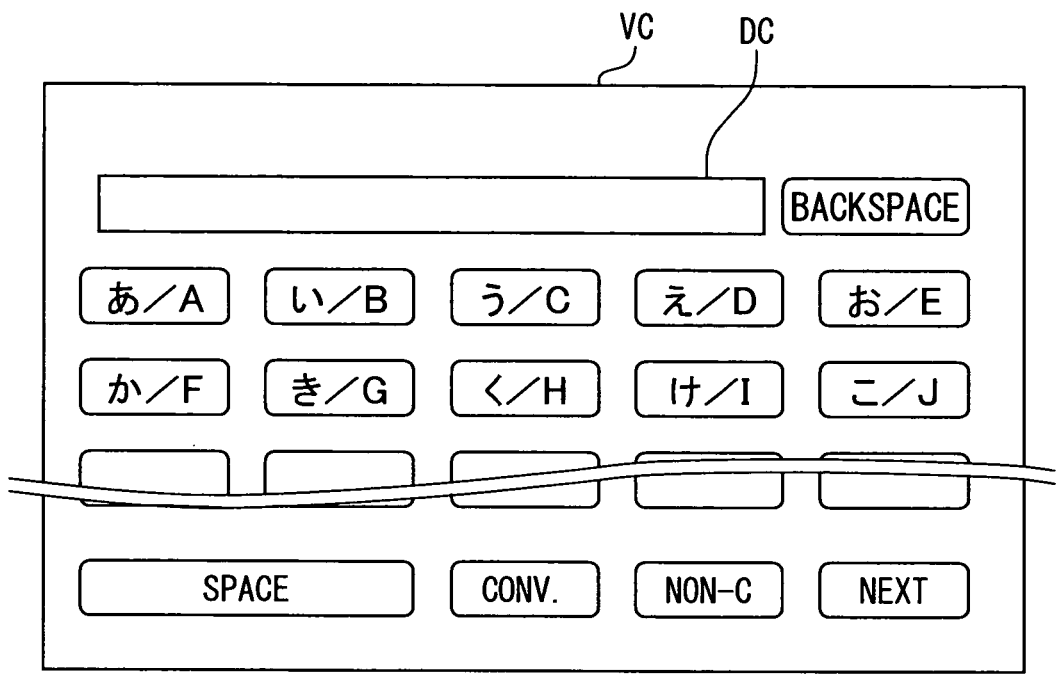
FIG. 4 is a plan view of one example of a character input screen image.

At the beginning of the character input processing, in S110, the control unit 39 displays the character input screen image on the display device 35. The character input screen image functions as a graphical user interface. FIG. 4 is a plan view of one example of a character input screen image.

As shown in FIG. 4, the character input screen image is a keyboard image VC which has a plurality of input objects, i.e., operational keys. Some input objects are assigned two characters. Two characters assigned to each input object are expressed as a first character and a second character. In the illustrated case, each input object is assigned with a Japanese Hiragana character as the first character and an alphabet character as the second character.

Then, the control unit 39 performs the following steps from S120. The control unit 39 enters and retrieves one character from the first character and the second character assigned to one input object which is selected by touching a corresponding area of the touch panel 33 with a finger of a user.

In S120, the control unit 39 waits until an operation signal is supplied from the touch panel 33. The touch panel 33 detects a touching motion of a finger on a touch surface thereof. The touching motion is carried out through the conductive film 31. The touch panel 33 locates coordinates where the touching motion is carried out, and generates the operation signal indicative of the coordinates. The touch panel 33 supplies the operation signal to the control unit 39. Therefore, the operation signal and the coordinates indicate the input object selected by a user.

If the operation signal is supplied from the touch panel 33, the routine proceeds to "YES" from S120. In S130, the control unit 39 identifies the input object which is actually touched based on an arrangement of the input objects currently displayed on the display device 35.

In S140, it is determined that whether there is an input object on the coordinates supplied from the touch panel 33 or not. If it is failed to identify the input object, for example, there is not input object, the routine proceeds to "NO" from S140 and returns to S120. On the other hand, if the input object is successfully identified, the routine proceeds to "YES" from S140. In S150, it is determined that whether the input object touched is one of input objects for inputting characters or not.

In addition to the input objects for inputting characters, the character input screen image includes input objects for specific functions, such as for inputting a space, for entering a converting command to the Japanese Kanji character, for entering a converting command between lowercase and uppercase. In this embodiment, those input objects for specific functions are not assigned with a plurality of functions. Therefore, the control unit 39 determines that whether the input object touched is the input object assigned with a plurality of functions or not by determining whether the input object touched is the input object for character input or not.

In a case that the input object touched is the input object for character input, the routine proceeds to "YES" from S150. In S160, the control unit 39 determines that whether the touching motion on the input object is carried out by a finger equipped with the ring 10 or not. Hereinafter, the finger equipped with the ring 10 may be referred to as a ringed finger.

In detail, the finger performing the touching motion can be distinguished based on the condition signal supplied from the signal detector 37 when the operation signal is supplied from the touch panel 33. If the YES signal is supplied, the touching motion is carried out by the ringed finger, therefore, the routine proceeds to "YES" from S160. If the NO signal is supplied, the touching motion is not carried out by the ringed finger, therefore, the routine proceeds to "NO" from S160.

In S170, the control unit 39 enables to enter the first character assigned to the input object touched by the finger as an input character. In S170, the control unit 39 also displays the input character on a display area DC on the character input screen image. Then, the routine returns to S120.

In S175, the control unit 39 enables to enter the second character assigned to the input object touched by the ringed finger as an input character. In S175, the control unit 39 also displays the input character on a display area DC on the character input screen image. Then, the routine returns to S120.

In S150, if it is determined that the input object touched is not the input object for character input, the routine proceeds to S180. In S180, it is determined that whether the input object touched is a "NEXT" object or not. The "NEXT"

object corresponds to an enter key for entering a command to complete input processing. If the input object touched is the "NEXT" object, the routine proceeds to "YES" from S180. In S190, the control unit 39 fixes characters which are displayed on the display area DC as an input character string, and complete the input processing.

On the other hand, if the input object touched is not the "NEXT" object, the routine proceeds to "NO" from S180. In S185, the control unit 39 performs a function corresponding to the input object touched. For example, in a case that the input object touched is the input object for inputting a space, the control unit 39 performs a function entering a space on the last of the character string displayed on the display area DC. In a case that the input object touched is the input object for entering a converting command to the Japanese Kanji character, the control unit 39 performs a function converting a character string displayed on the display area DC into a character string including a Kanji character. Then, the routine returns to S120.

As described above, in the information processing system 1, a plurality of characters are assigned to one of the input objects displayed on the character input screen image. In other words, one input object is prepared to generate an operation signal which corresponds to two functions for inputting two characters. The information processing system 1 determines that whether the finger touched one of the input objects is the ringed finger or not based on the condition signal supplied from the signal detector 37. The information processing system 1 selects and switches input characters to be entered as an input character according to the condition signal. As a result, although only one input object is touched only one time, it is possible to enter a desired one character among the plurality of characters. Therefore, it is not necessary to selectively display two screen images for different character input, such as the screen for alphabet inputs and the screen for Hiragana input. The electronic device 30 does not require a user to command changing of the screen images. The user can easily change the kinds of characters by selectively using fingers to touch the touch panel 33. According to the electronic device 30, it is not necessary to prepare an input object for a screen change on the character input screen image. It is possible to reduce the number of input objects displayed on the character input screen image. It is possible to display the character input screen image which is easy to operate. Therefore, according to the information processing system 1, it is possible to improve operability of the electronic device 30. In the embodiment, the input device corresponds to the touch panel 33. The performing module corresponds to the control unit 39. The receiver module corresponds to the conductive film 31 as the electric conductor and the signal detector 37. One of two functions corresponds to a function for inputting the Hiragana character. The other one of two functions corresponds to a function for inputting the alphabet character.

In this embodiment, at least two characters are displayed on one input object as shown in FIG. 4, therefore, it is necessary to display each characters in small sizes. Therefore, some users, such as elderly users, may not feel sufficient improvement of operability. Therefore, the information processing system 1 may be configured to selectively display the screen for alphabet input, and the screen for Hiragana input according to the detection result of whether the finger touched the touch panel 33 is the ringed finger or the finger without the ring.

Second Embodiment

Figure 5:
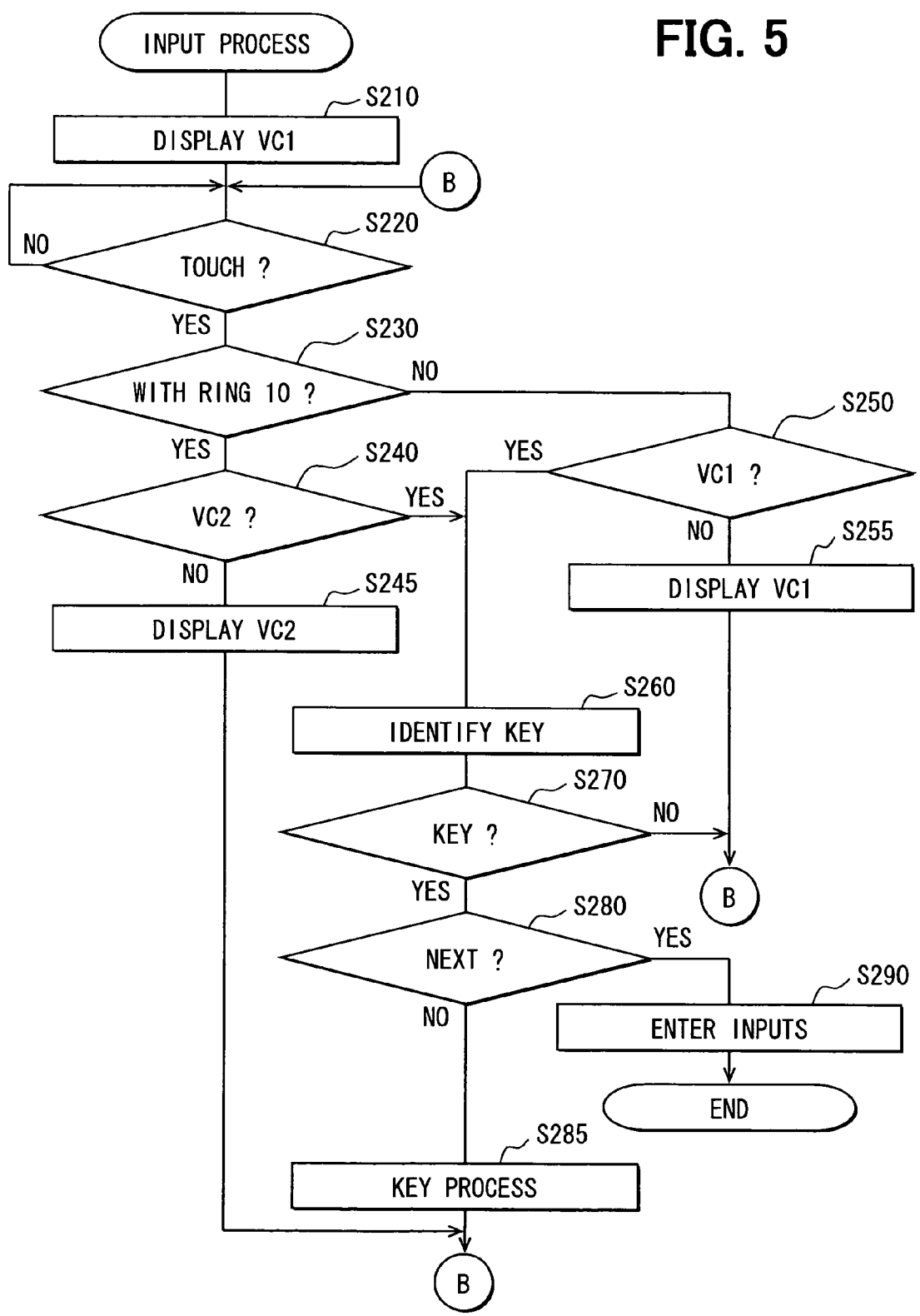
FIG. 5 is a flow chart showing character input processing performed by the information processing system according to a second embodiment of the present invention.
Figure 6A:
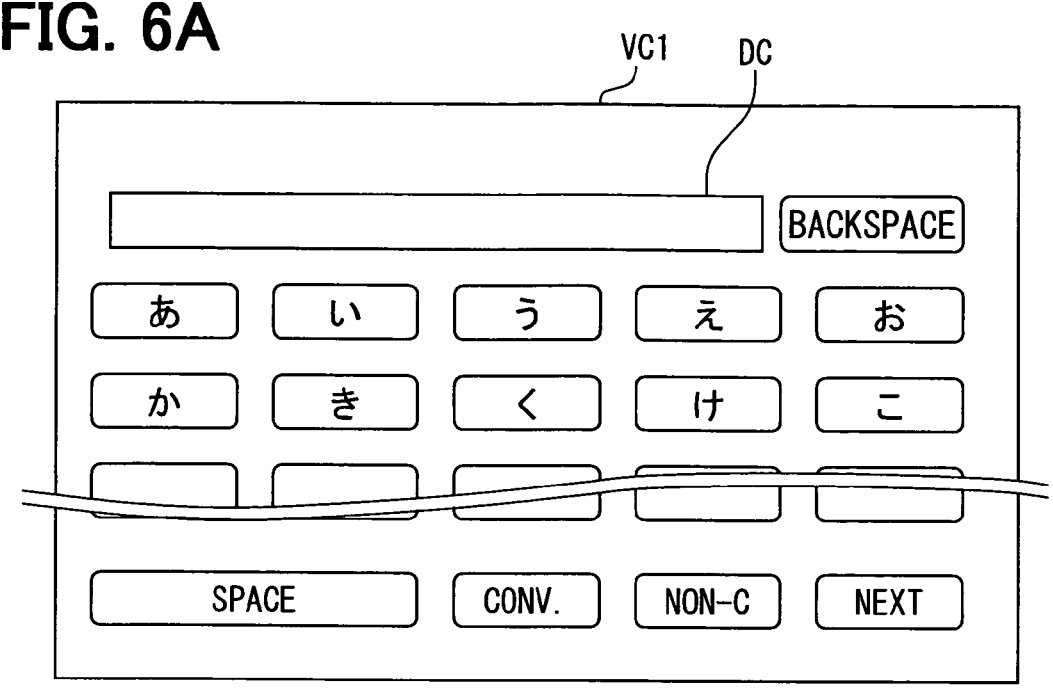
FIG. 6A is a plan view of one of character input screen images according to the second embodiment.

An information processing system 1 according to a second embodiment is explained based on FIG. 5 and FIG. 6. The second embodiment has components shown in FIG. 1. FIG. 5 is a flow chart showing character input processing performed by the control unit 39. At the beginning of the character input processing, in S210, the control unit 39 displays the character input screen image for Hiragana input on the display device 35. The character input screen image for Hiragana input is referred to as a first input screen image VC1. FIG. 6A is a plan view of the first input screen image VC1. In this embodiment, a single character is assigned to each input object on the character input screen image.

Figure 6B:
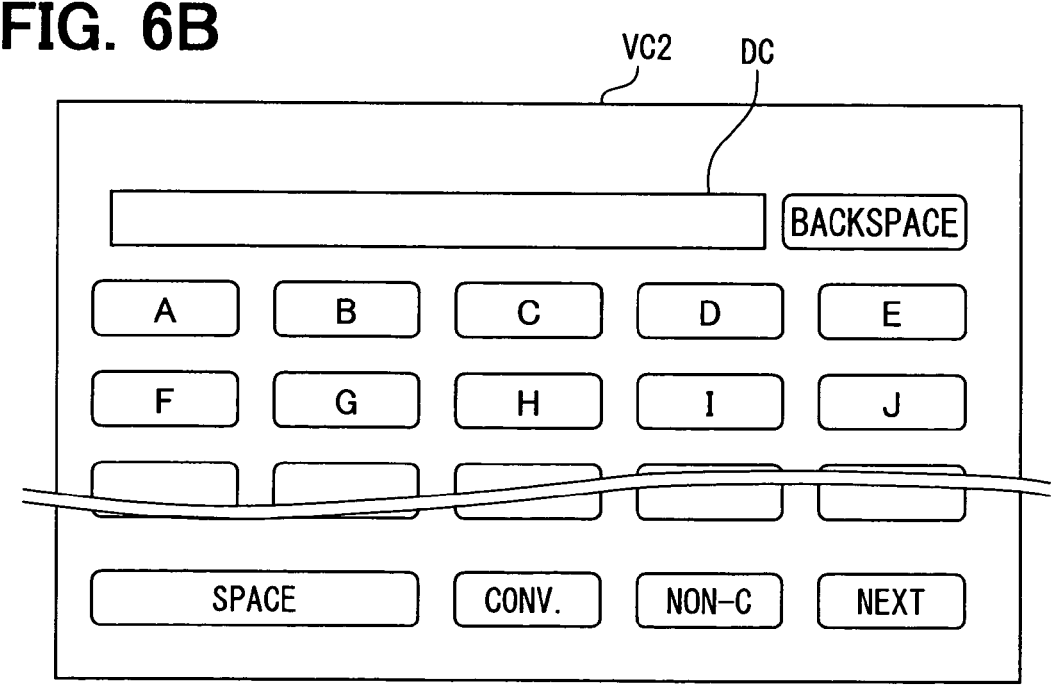
FIG. 6B is a plan view of the other one of character input screen images according to the second embodiment.

In S220, the control unit 39 performs the processing described in S120. In S230, the control unit 39 performs the processing described in S160. In S240, the control unit 39 determines that whether a character input screen image for alphabet input is presently displayed on the display device 35 or not. The character input screen image for alphabet input is referred to as a second input screen image VC2. FIG. 6B is a plan view of the second input screen image VC2.

If the second input screen image VC2 is presently displayed, the routine proceeds to "YES" from S240, and proceeds to S260. If the first input screen image VC1 is presently displayed, the routine proceeds to "NO" from S240, and proceeds to S245. In S245, the control unit 39 displays the second input screen image on the display device 35 instead of the first input screen image, and, then, returns the routine to S220.

In S250, the control unit 39 determines that whether the first input screen image VC1 is presently displayed on the display device 35 or not. If the first input screen image VC1 is presently displayed, the routine proceeds to "YES" from S250, and proceeds to S260. If the second input screen image VC2 is presently displayed, the routine proceeds to "NO" from S250, and proceeds S255. In S255, the control unit 39 displays the first input screen image on the display device 35 instead of the second input screen image, and, then, returns the routine to S220.

In S260, the control unit 39 performs the processing described in S130. That is, when the first input screen image VC1 is currently displayed on the display device 35, the control unit 39 identifies the input object touched by the user based on the arrangement of the input objects on the first input screen image VC1. When the second input screen image VC2 is currently displayed on the display device 35, the control unit 39 identifies the input object touched by the user based on the arrangement of the input objects on the second input screen image VC2.

In S270, the control unit 39 performs the processing described in S140. In S280, the control unit 39 performs the processing described in S180. In S290, the control unit 39 performs the processing described in S190. In S285, the control unit 39 performs the processing described in S185. In addition, in S285, the control unit 39 also performs the processing described in S160, S170, and S175.

In detail, if an input object for character input is touched, the device enters a character assigned to the input object touched, and displays the entered character on the display area DC. For example, the input object for the first Hiragana character displayed on the first input screen image VC1 and the input object for the first alphabet character "A" displayed on the second screen image VC2 are located on the same coordinates on the display device 35 and the touch panel 33. Therefore, the touch panel 33 supplies the identical operation signal in both a case that the input object for the first Hiragana character is touched and a case that the input object for the first alphabet character is touched.

In the embodiment, the control unit 39 already knows that which one of the character input screen images VC1 and VC2 are displayed on the display device 35 by performing the processing in S230, S245, and S250. As a result, when the user touches the touch panel 33 with the finger without the ring 10, the control unit 39 can display the first input screen image VC1 and can enable to enter the first Hiragana character indicated by the operation signal from the touch panel 33. When the user touches the touch panel 33 with the ringed finger, the control unit 39 can display the second input screen image VC2 and can enable to enter the first alphabet character indicated by the operation signal from the touch panel 33. Thus, after finishing the function by S285, the control unit 39 returns the routine to S220, and waits until the next touching motion is made.

As described above, the electronic device 30 in the second embodiment displays the first input screen image VC1 when the touch panel 33 is touched with a finger without the ring 10. The electronic device 30 displays the second input screen image VC2 when the touch panel 33 is touched with the ringed finger. Therefore, the presently displayed image indicates the detection result of the signal detector 37. Then, the electronic device 30 enables to enter a character which is identified by both the operation signal supplied from the touch panel 33 and the input screen image presently displayed. Therefore, the user can select the kinds of characters by just selecting fingers to touch the touch panel 33, and can perform character input operation at the same time. Therefore, it is not necessary to display an input object for changing screen images on a character input screen image. The user can select and switch the character input screen images without operation to such an input object. It is possible to improve operability of the electronic device 30.

In this embodiment, one input object displayed on the same coordinates on the first and second input screen images VC1 and VC2 is prepared to generate an operation signal which corresponds to two functions for inputting two characters. In this embodiment, the performing module (control unit) 39 is configured to be able to perform a plurality of functions corresponding to the coordinates supplied from the input device (touch panel) 33. In response to a supply of the coordinates from the input device by detecting the touching motion, the performing module selectively performs one function according to the detection result of the receiver module (signal detector) 37, the one function being selected from the functions corresponding to the coordinates. In this embodiment, the performing module (control unit) 39 changes operation screen images VC1, and VC2 displayed on the display device 35 according to the detection result of the receiver module (signal detector) 37. The performing module 39 selectively performs one function according to the detection result of the receiver module by performing the function corresponding to a user's operation information which is indicated by the operation screen image displayed on the display device and is determined based on the operation signal supplied from the input device. The display device corresponds to the display device 35. The function for selecting the operation screen images corresponds to the steps S230-S255 which select the character input screen images according to the detection result of the signal detector 37.

In the first and second embodiment, the electric signal is supplied into a body part of a user from the ring 10 by using the electric field system. Therefore, it is possible to detect proximity of the body part to the conductive film 31 because the electric signal can be transmitted from the body part to the conductive film 31 by a capacitive coupling. In order to detect proximity of the conductive film 31 and the body part, a threshold value in the signal detector 37 is adjusted to detect the proximity. As a result, it is possible to supply the YES signal in response to the proximity before the ringed finger comes in contact with the conductive film 31. In this case, the selecting and switching of the character input screen images can be performed in response to proximity of the conductive film 31 and the ringed finger.

Third Embodiment

Figure 7:
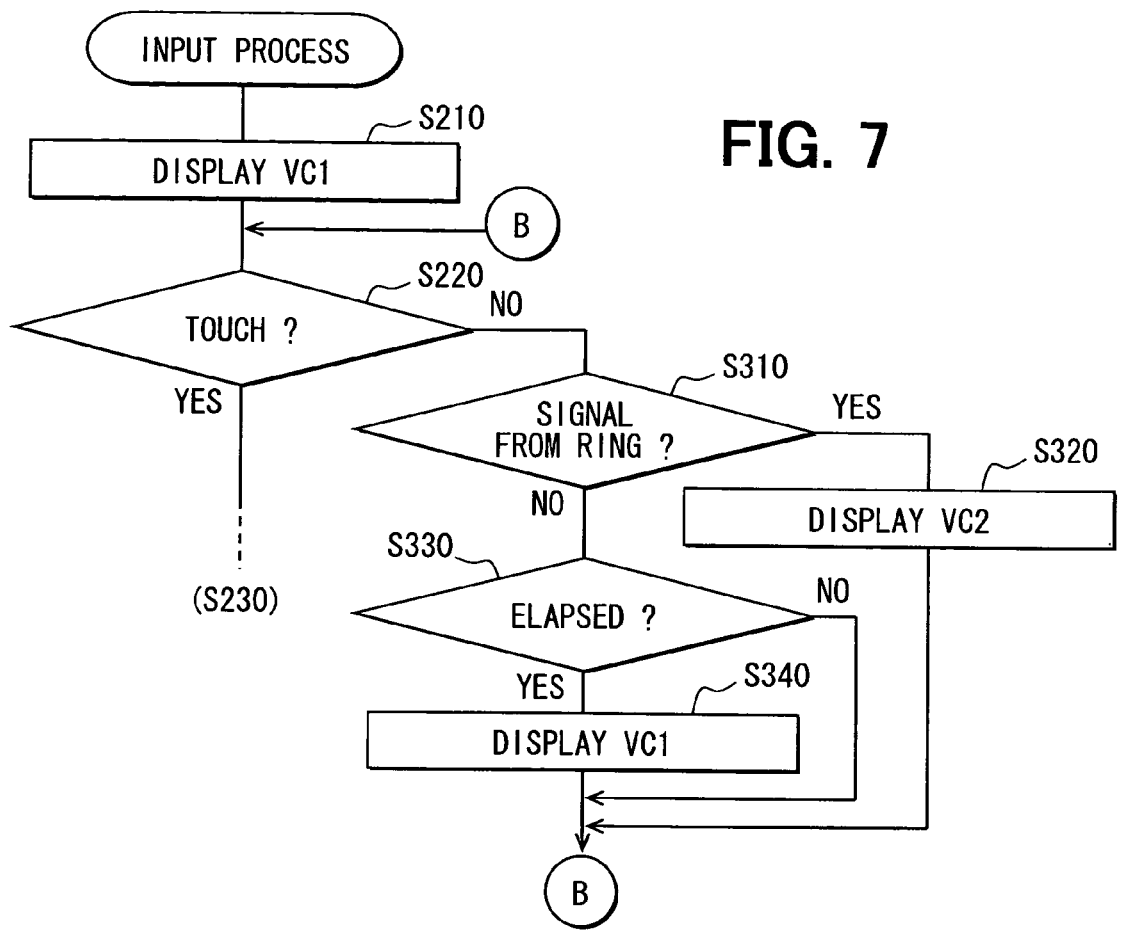
FIG. 7 is a flow chart showing character input processing performed by the information processing system according to a third embodiment of the present invention.

An information processing system 1 according to a third embodiment is explained based on FIG. 7. In the third embodiment, a threshold value in the signal detector 37 is adjusted to detect both a contact and proximity of the conductive film 31 and the body part on which the transmitter module 10 is equipped. FIG. 7 is a flow chart showing character input processing performed by the control unit 39. The processing in S210, S220, and S230 are described in the second embodiment. If the operation signal is not supplied from the touch panel 33, the control unit 39 proceeds the routine to S310. In S310, the control unit 39 determines that whether the YES signal is supplied from the signal detector 37 or not.

If the YES signal is supplied from the signal detector 37, the routine proceeds to "YES" from S310. In S320, the control unit 39 displays the second input screen image VC2 on the display device 35 instead of the first input screen image VC1, and, then, returns the routine to S220. If the second input screen image VC2 is already displayed, in S320, the control unit 39 maintains the display, and returns the routine to S220.

On the other hand, if the YES signal is not supplied from the signal detector 37, the routine proceeds to "NO" from S310. In S330, the control unit 39 determines that whether it is elapsed a predetermined time period from a change of the condition signal from the YES signal to the NO signal or not.

If the predetermined time period has not yet elapsed, the routine proceeds to "YES" from S330. If the predetermined time period has already elapsed, the routine proceeds to "NO" from S330. In S340, the control unit 39 displays the first input screen image VC1 on the display device 35 instead of the second input screen image VC2, and, then, returns the routine to S220.

In the third embodiment, the signal detector 37 supply the YES signal in response to both a contact and proximity of the conductive film 31 and the ringed finger. In addition, the control unit 39 is configured to display the second input screen image VC2 in response, to a detection of the proximity. The second input screen image VC2 is maintained at least for the predetermined time period even after the ringed finger is distanced far from the conductive film 31. In other words, during a waiting period for the operation signal from the touch panel 33, the electronic device 30 initially displays the first input screen image VC1, but, the electronic device 30 displays the second input screen image VC2 for the predetermined time period in response to the YES signal from the signal detector 37.

Therefore, according to the third embodiment, a user can call the character input screen image associated with the ringed finger by just approaching the ringed finger to the touch panel 33 and can enter the character displayed on the character input screen image. That is, it is not necessary to directly touch the ringed finger on the touch panel 33 to switch the character input screen images from the first input screen image VC1 to the second input screen image VC2. It is possible to provide even easier operation.

Fourth Embodiment

Figure 8:
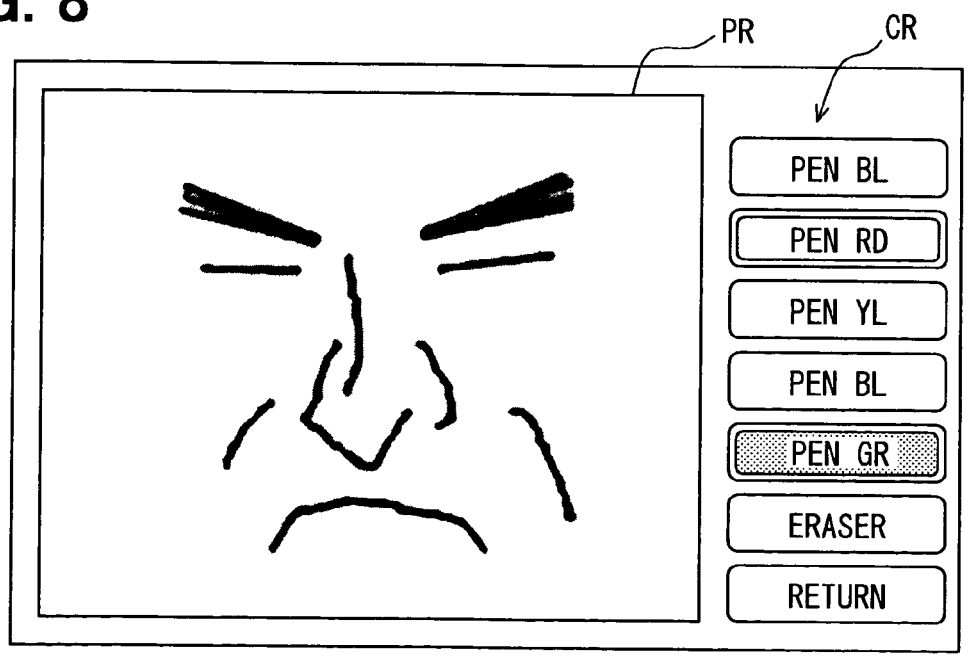
FIG. 8 is a plan view of a display screen image according to a fourth embodiment of the present invention.
Figure 9:
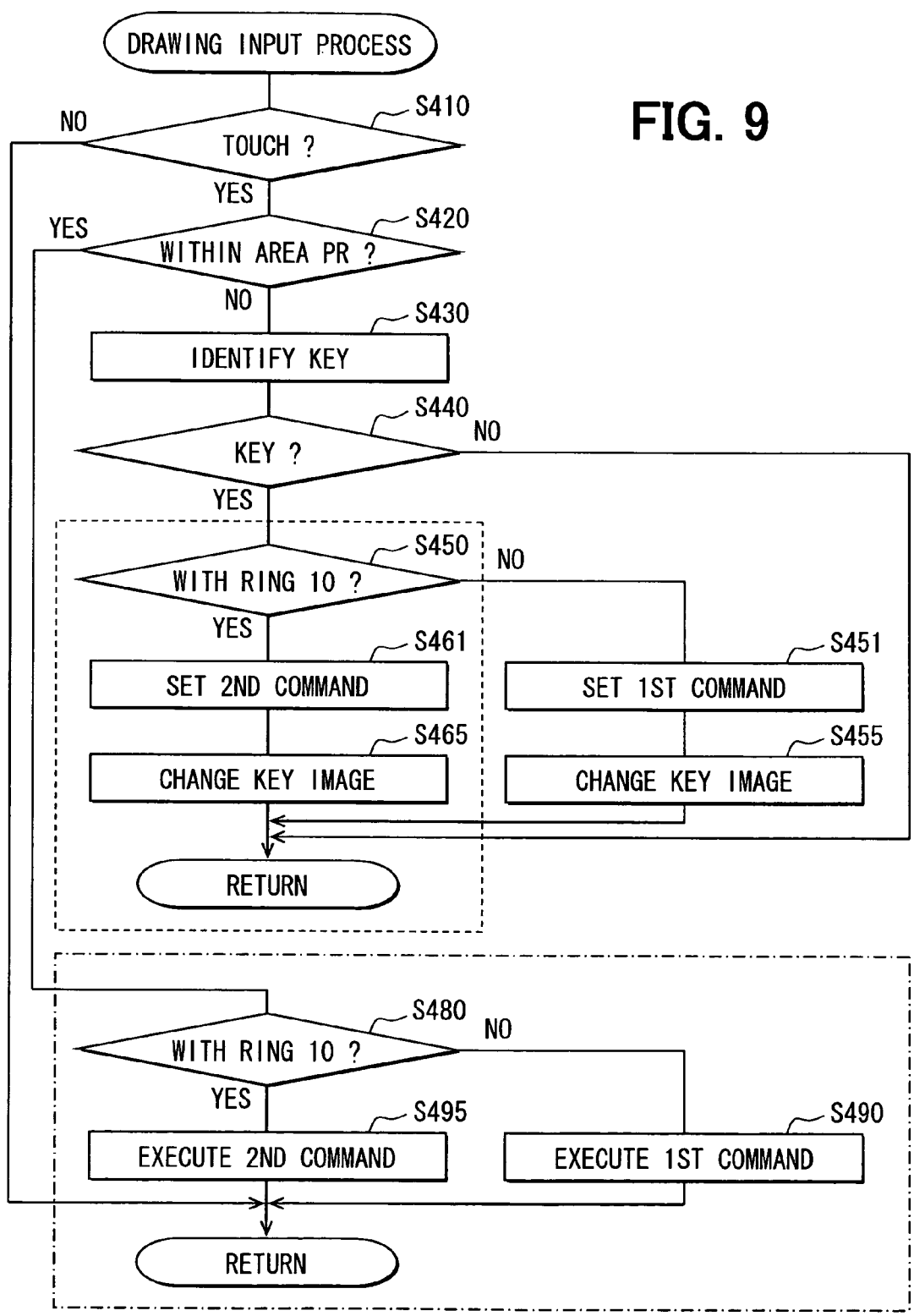
FIG. 9 is a flow chart showing drawing input processing performed by the information processing system according to the fourth embodiment.

A fourth embodiment of the present invention is described by referring to FIG. 8 and FIG. 9. FIG. 8 is a plan view of a display screen image on the display device 35. In this embodiment, the control unit 39 provides a drawing tool on which the user can draw lines on a drawing area PR in the display screen image. The control unit 39 retrieves a drawing operation performed on the touch panel 33 by a user and displays a drawing, such as a line, on the display device 35. In detail, the control device 39 displays a drawing area PR and a command key area CR on the display device 35. The command key area CR includes a plurality of input objects. The control unit 39 can determine that whether the touch panel 33 is touched with the ringed finger or not based on the condition signal supplied from the signal detector 37. The control unit 39 stores and displays a drawing drawn by the ringed finger by a specific color which is assigned to the ringed finger. The control unit 39 stores and displays a drawing drawn by the finger without the ring 10 in a specific color which is assigned to the finger without the ring 10. An assignment of color is carried out at the command key area CR. That is, the command key area CR is used to assign one of functions, such as functions for drawing pens with specific colors and a function for eraser, to each one of fingers. FIG. 9 is a flow chart showing drawing input processing which is repeatedly performed by the control unit 39 after displaying an initial screen image on the display device 35.

At the beginning of the drawing input processing, in S410, the control unit 39 determines that whether the operation signal is supplied from the touch panel 33. If the operation input is not supplied, the routine proceeds to "NO" from S410. Then, the control unit 39 repeats S410 in a predetermined interval, and waits until the operation signal is supplied from the touch panel 33.

If the operation input is not supplied, the routine proceeds to "YES" from S410. In S420, the control unit 39 determines that whether the touch motion is carried out on the drawing area PR or not by determining that whether the coordinates indicated by the operation signal corresponds to the drawing area PR or not. If the touch motion is carried out on the drawing area PR, the routine proceeds to "YES" from S420 and proceeds to S480. If the touch motion is not carried out on the drawing area PR, the routine proceeds to "NO" from S420 and proceeds to S430.

In S430, the control unit 39 performs the processing described in S130. In detail, the control unit 39 identifies the input object touched by the finger on the command key area CR.

In S440, the control unit 39 performs the processing described in S140. If no input object is displayed on a position indicated by the coordinates supplied from the touch panel 33, the control unit 39 proceeds to "NO" from S440, and returns the routine. In this case, the operation signal supplied is discarded and handled as a signal indicating an invalid touch motion.

On the other hand, if the input object is successfully identified, the routine proceeds to "YES" from S440. In S450, the control unit 39 determines that whether the touching motion on the input object is carried out by the ringed finger or not based on the condition signal supplied from the signal detector 37. In S450, the control unit 39 performs the processing described in S160.

If the touching motion is not carried out by the ringed finger, the routine proceeds to "NO" from S450. In S451, the control unit 39 sets a command assigned on the input object touched as a first commend. The first command may be referred to as a command assigned to a normal finger which is not equipped with the ring 10. In S455, the control unit 39 displays a first effect image on the input object touched in an overlapping manner. In detail, the key touched by a finger is turned into a translucent form. As a result, display image of the key touched is changed from the normal image to the first image. The first image is apparently different from the normal image so that the user can understand that the command displayed on the key is assigned to the normal finger. Then, the routine returns to the beginning. In this embodiment, the control unit 39 shows a function which is performed when a user touches the drawing area PR with a body part other than the ringed finger by adding a visible effect on the input object which is touched by the user.

In S455, if the first effect image is already applied on the other one of the input objects, the control unit 39 removes the first effect image from the other input objects, and applies the first effect image to the input object touched this time. Thus, only one of the input objects on the command key area CR is displayed with the first effect image in order to highlight it. In an illustrated case shown in FIG. 8, the input object displayed with "PEN GR" is highlighted by the first effect image. The first effect image is illustrated by an outer line.

On the other hand, if the touching motion is carried out by the ringed finger, the routine proceeds to "YES" from S450. In S461, the control unit 39 sets a command assigned on the input object touched as a second commend. The second command may be referred to as a command assigned to the ringed finger. In S465, the control unit 39 displays a second effect image on the input object touched in an overlapping manner. The display image of the key is changed from the normal image to the second image. Then, the routine returns to the beginning.

In this embodiment, the control unit 39 shows a function which is performed when a user touches the drawing area PR with the ringed finger by adding a visible effect on the input object which is touched by the user. In an illustrated case shown in FIG. 8, the input object displayed with "PEN RD" is highlighted by the second effect image. The second effect image is illustrated by an outer line of the input object. The first effect image and the second effect image are set in different forms, such as different colors.

If the touch motion is carried out on the drawing area PR, the routine proceeds to S480. In S480, the control unit 39, determines that whether the touching motion to the touch panel 33 is carried out with the ringed finger or not. If the touching motion is not carried out with the ringed finger, the routine proceeds to "NO" from S480. In S490, the control unit 39 performs a first drawing function indicated by the first command assigned to the normal finger.

In the illustrated case, the first command is "PEN GR" which means a drawing function of a pen with green color. Therefore, the control unit 39 displays a green colored line on the drawing area PR in response to the coordinates continuously supplied from the touch panel 33 until the user completes the touching motion. Alternatively, if the first command is "ERASER", the control unit 39 erases a line on the drawing area PR in response to the coordinates continuously supplied from the touch panel 33 until the user completes the touching motion. Alternatively, if the first command is "RETURN", the control unit 39 invalidates the last function performed before, and steps back a drawing to the before.

If the touching motion is carried out with the ringed finger, the routine proceeds to "YES" from S480. In S495, the control unit 39 performs a second drawing function indicated by the second command assigned to the ringed finger. The detail of processing in S495 is similar to that in S490. Predetermined drawing functions are initially set as the first command and the second command. Therefore, even if a setting procedure from S420-S465 has not yet carried out, the electric device 30 can work as a drawing tool. Then, the routine returns to the beginning.

As mentioned above, according to the fourth embodiment, it is possible to assign different functions to a body part which is equipped with the transmitter module 10 and a body part which is not equipped with the transmitter module 10. In detail it is possible to assign different drawing functions to the ringed finger and a body part other than the ringed finger. Therefore, the user can select and switch the drawing functions by just selecting a finger to touch the touch panel 33. Therefore, a user can easily draw a colorful drawing through the touch panel 33.

In addition, the electronic device 30 is configured to change a relationship between the drawing functions to be performed in response to the operation signal and the condition signal from the signal detector 37 according to an instructive operation carried out by a user. That is, it is possible to input a user's instruction through the command key area, and to change at least one of the function to be performed when a touching motion is carried out with the ringed finger and the function to be performed when a touching motion is carried out with the other body part according to the instruction. A user can comfortably draw a drawing with fingers on the drawing area PR by performing a preference setting. For example, it is possible to assign a frequently using color to the finger which is easy to manipulate. As a result, it is possible to improve operability to draw a drawing through the touch panel 33. In other words, the control unit 39 is configured to provide a setting module S430-S465 which changes a relationship between the function which should be performed corresponding to the operation signal supplied from the input device and the detection result of the receiving module according to an instruction from the user.

Fifth Embodiment

Figure 10A:
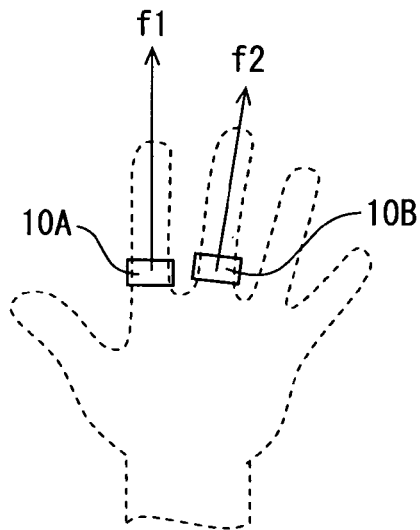
FIG. 10A is a block diagram showing transmitter modules wearable as rings according to a fifth embodiment of the present invention.
Figure 10B:
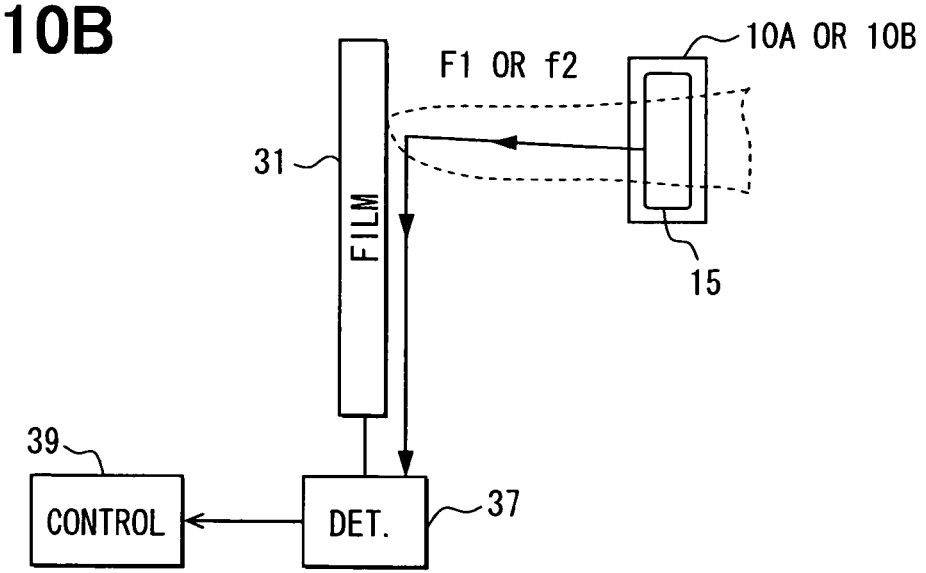
FIG. 10B is a block diagram showing components for detecting a signal from the transmitter modules.

A fifth embodiment of the present invention is described by referring to FIGS. 10A, 10B and 11. In this embodiment, two transmitter modules are used in a information processing system 1. Therefore, the touch panel 33 may be touched with a first ringed finger, a second ringed finger, and a body part other than the ringed fingers. FIG. 10A is a block diagram showing transmitter modules wearable as rings according to the fifth embodiment. FIG. 10B is a block diagram showing components for detecting signals from the transmitter modules. As shown in FIGS. 10A and 10B, the information processing system 1 of this embodiment is configured so that the electronic device 30 is operated by a user who wears a plurality of transmitter modules 10A and 10B on different body parts. The transmitter modules 10A and 10B are formed in ring shape. The transmitter modules 10A and 10B are referred to as a first ring 10A and a second ring 10B. A finger equipped with the first ring 10A is referred to as a first ringed finger. A finger equipped with the second ring 10B is referred to as a second ringed finger. The first and second rings 10A and 10B are configured to transmit electric signal with identification information in order to allow the signal detector 37 identifies the first ring 10A or the second ring 10B. In the embodiment, the identification information is a frequency. The first ring 10A transmits an electric signal with a frequency f1. The second ring 10B transmits an electric signal with a frequency f2. The signal detector 37 is configured to receive both the electric signal with the frequency f1 and the electric signal with the frequency f2. The signal detector 37 determines that whether at least one of the electric signals is detected with a predetermined condition or not. The signal detector 37 generates the condition signal indicative of the ring 10A or 10B and supplies it to the control unit 39. When the electric signal with the frequency f1 is detected with certain strength, the signal detector 37 generates and supplies a YES1 signal to the control unit 39. When the electric signal with the frequency f2 is detected with certain strength, the signal detector 37 generates and supplies a YES2 signal to the control unit 39.

FIG. 10B shows a state in which the touch panel 33 is operated by one of the ringed fingers. Transmitting path of the electric signal is illustrated by arrow symbols. The signal detector 37 includes a correspondence table between the frequencies f1 and f2, and an identification codes for the rings. The signal detector 37 generates the condition signal based on the correspondence table. The signal generator 37 also generates and supplies the NO signal, when both the electric signals are not detected.

Figure 11A:
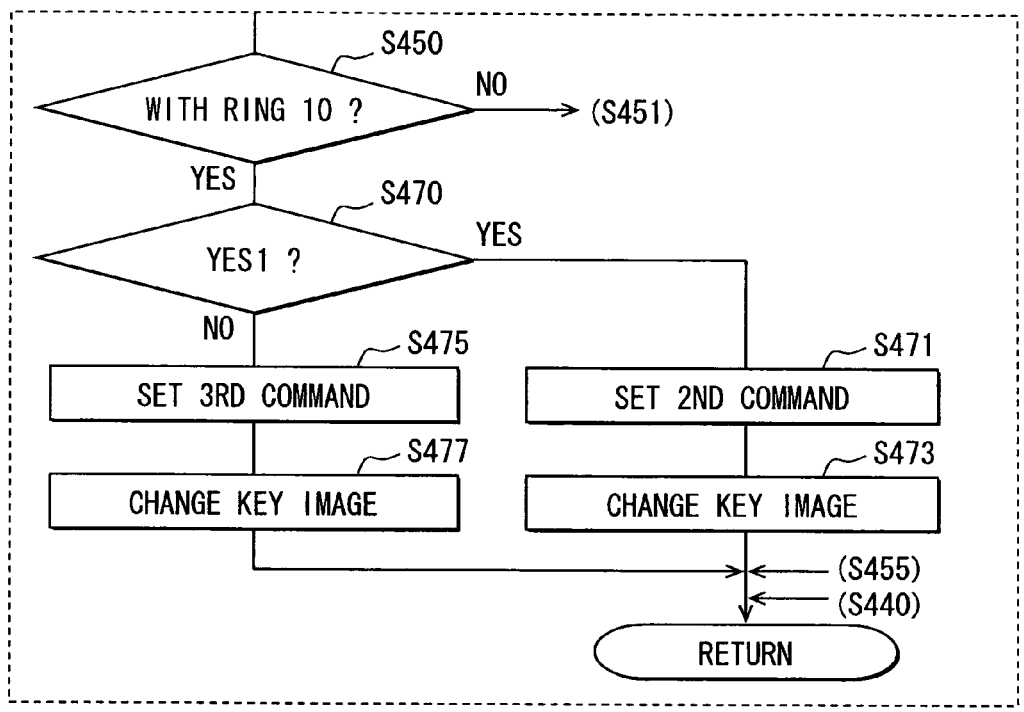
FIG. 11A is a partial flow chart performed in the fifth embodiment.
Figure 11B:
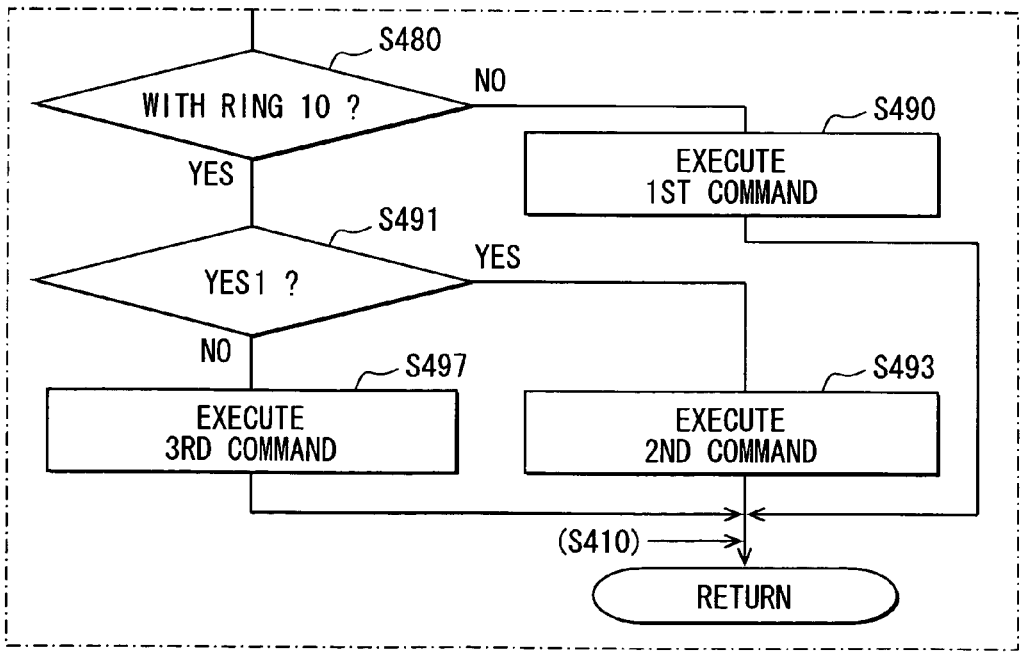
FIG. 11B is a partial flow chart performed in the fifth embodiment.

Then, the drawing input processing performed by the control unit 39 is explained referring to FIGS. 11A and 11B. FIG. 11A shows a replacement for a part indicated by a broken line in FIG. 9. FIG. 11B shows a replacement for a part indicated by a dashed line in FIG. 9.

In S450, the control unit 39 determines that whether the touching motion is carried out by at least one of the first ringed finger and the second ringed finger or not. That is, it is determined that whether the condition signal supplied from the signal detector 37 at the time of the present touching motion is the YES1 signal or the YES2 signal. If it is determined that the touching motion is not carried out by at least one of the first ringed finger and the second ringed finger, the routine proceeds to "NO" from S450, and proceeds to S451. If it is determined that the touching motion is carried out by one of the ringed fingers, the routine proceeds to "YES" from S450, and proceeds to S470.

In S470, the control unit 39 determines that whether the condition signal is the YES1 signal or the YES2 signal. By S470, the control unit 39 determines that whether the touching motion is carried out by the first ringed finger or the second ringed finger. If it is determined that the YES1 signal is supplied from the signal detector 37, the routine proceeds to "YES" from S470. In S471, the control unit 39 sets a command assigned on the input object touched as a second commend. The second command may be referred to as a command assigned to the first ringed finger. In S473, the control unit 39 displays a second effect image on the input object touched in an overlapping manner. The display image of the key is changed from the normal image to the second image. Then, the routine returns to the beginning.

If it is determined that the YES2 signal is supplied from the signal detector 37, the routine proceeds to "NO" from S470. In S475, the control unit 39 sets a command assigned on the input object touched as a third commend. The third command may be referred to as a command assigned to the second ringed finger. In S477, the control unit 39 displays a third effect image on the input object touched in an overlapping manner. The display image of the key is changed from the normal image to the third image. Then, the routine returns to the beginning. The third effect image is different from both the first and second effect images. The third effect image may be a flashing outer line of the input object.

In S480, the control unit 39 performs the processing described in S450 shown in FIG. 11A. In S491, the control unit 39 performs the processing described in S470 shown in FIG. 11A. If the YES1 signal is supplied, the routine proceeds to "YES" from S491. In S493, the control unit 39 performs a second drawing function indicated by the second command assigned to the first ringed finger. If the YES1 signal is not supplied, the routine proceeds to "NO" from S491. In S497, the control unit 39 performs a third drawing function indicated by the third command assigned to the second ringed finger. Then, the routine returns to the beginning.

According to the embodiment, it is possible to assign three functions to corresponding one of fingers. Alternatively, three or more transmitter modules may be used in order to enable a user to assign even more functions to corresponding fingers. As a result, it is possible to improve operability to draw a drawing through the touch panel 33. In this embodiment, the receiver module (the signal detector) 37 detects a contact or proximity of an electric conductor 31 with each one of body parts of the user who wears a plurality of transmitter modules (the rings) 10A, 10B each of which transmits a unique electric signal through the body parts. The performing module 39 selectively performs the functions according to the detection result indicative of each one of the transmitter modules.

Sixth Embodiment

Figure 12A:
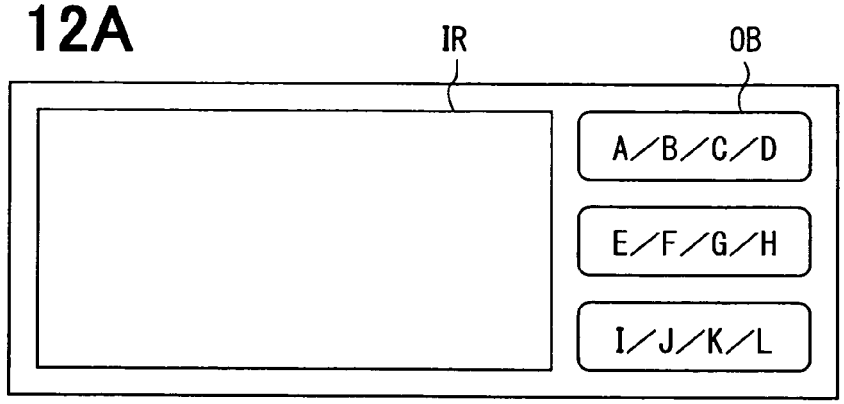
FIG. 12A is a plan view of a display screen image according to a sixth embodiment of the present invention.
Figure 12B:
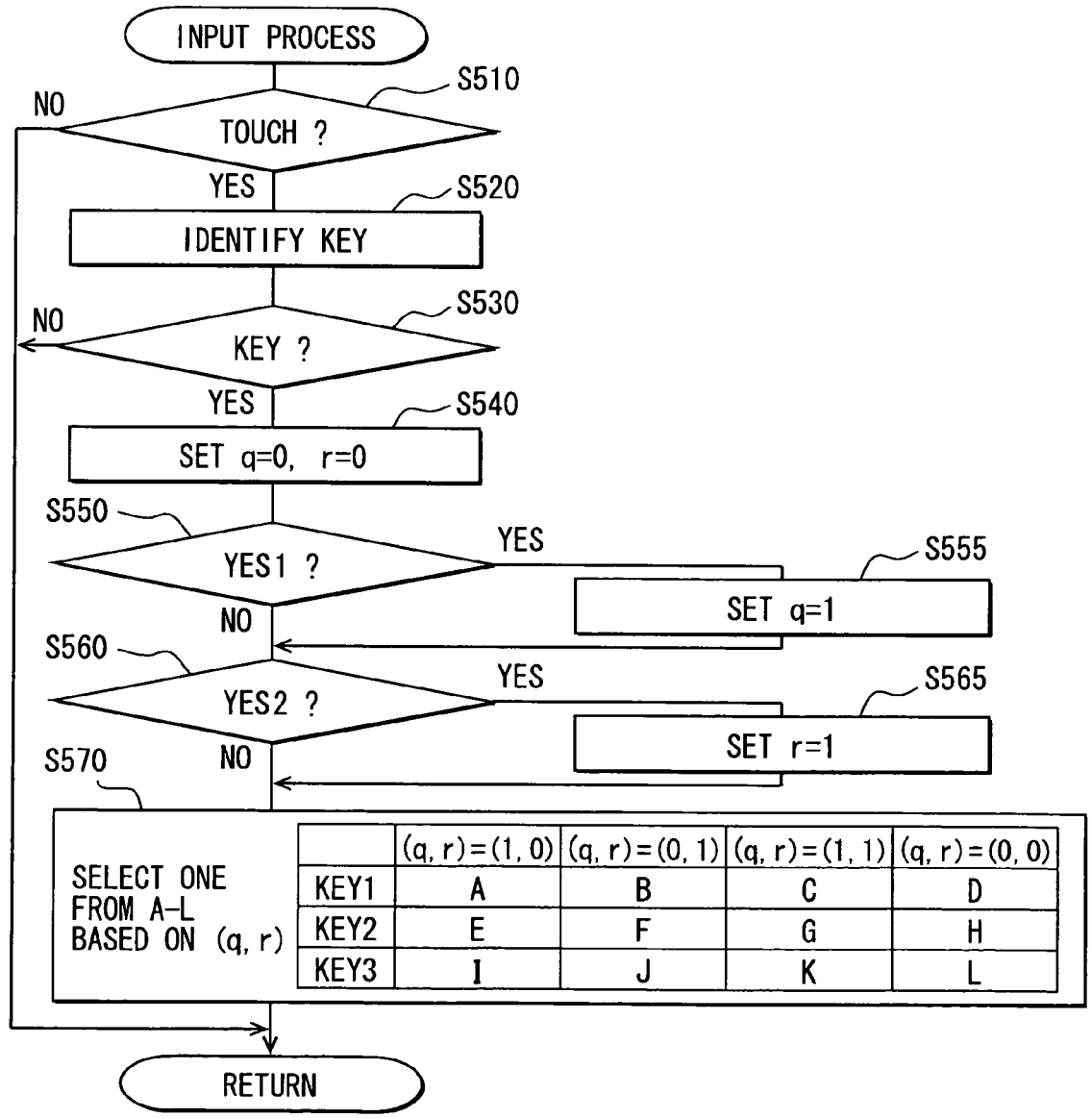
FIG. 12B is a flow chart showing input processing performed by the information processing system according to the sixth embodiment.

A sixth embodiment of the present invention is described by referring to FIGS. 12A and 12B. In the sixth embodiment, the electronic device 30 is not limited to a specific purpose, such as a character input tool and a drawing tool. FIG. 12A is a plan view of a display screen image according to the sixth embodiment. In this embodiment, the information processing system includes at least two transmitter modules. The electronic device 30 is operated by a user who wears at least two transmitter modules. In addition, the control device 39 displays at least three command for functions on one input object on the display device 35. In detail, there are two transmitter modules. Each input object is assigned with four commands for functions. Therefore, four commands are displayed on each input object. When one of the input objects is touched through the touch panel 33, the touch panel 33 supplies the operation signal indicative of the input object touched. Simultaneously, the conductive film 31 and the signal detector 37 supplies the detection result indicative of a combination of touching fingers. The control unit 39 recognizes four possible functions which are assigned to the input object touched based on the operation signal. Then, the control unit 39 selects one function from the possible four functions according to the detection result which is the combination of touching fingers, and performs the selected function. As a result, the control unit 39 selectively performs a function in response to the operation signal and the detection result.

FIG. 12A shows an information displaying are IR and three input objects OB. In this embodiment, it is permitted to touch the conductive film 31 with a plurality of ringed fingers simultaneously. To permit such operation, the signal detector 37 is configured to generate and supply the condition signal which contains information indicative of all ringed fingers.

FIG. 12B is a flow chart showing input processing performed by the information processing system according to the sixth embodiment. In S510, the control unit 39 performs the processing described in S120. In S520, the control unit 39 performs the processing described in S130. In S530, the control unit 39 performs the processing described in S140. If the input object is successfully identified, the routine proceeds to "YES" from S530. In S540, the control unit 39 resets both flags "q" and "r", i.e., q=0, r=0.

In S550, the control unit 39 determines that whether the YES1 signal is supplied or not. In other words, it is determined that whether the touching motion is carried out by the first ringed finger or not. If the YES1 signal is supplied, the routine proceeds to "YES" from S550. In S555, the control unit 39 sets the flag "q", i.e., q=1. If the YES1 signal is not supplied, the routine proceeds to "NO" from S550.

In S560, the control unit 39 determines that whether the YES2 signal is supplied or not. In other words, it is determined that whether the touching motion is carried out by the second ringed finger or not. If the YES2 signal is supplied, the routine proceeds to "YES" from S560. In S565, the control unit 39 sets the flag "r", i.e., r=1. If the YES2 signal is not supplied, the routine proceeds to "NO" from S560. S550 and S560 provide a combination detecting module which detects a combination of touching fingers. As a result, the electronic device 30 can recognize a plurality of operating conditions which is more than the number of the transmitter modules and is up to a square of the number of the transmitter modules. For example, the electronic device 30 recognizes four operating conditions by using two transmitter modules. The operating conditions include an operation by two ringed fingers, an operation by the first ringed finger, an operation by the second ringed finger, and an operation by a body part other than the ringed fingers.

In S570, the control unit 39 selects one function from a plurality of predetermined functions "A" to "L" based on the input object identified in S520 and the combination of touching fingers indicated by a combination of the flags "q" and "r". In addition, the control unit 39 performs the function which is selected. For example, if the input object shown on the right upper corner in FIG. 12A is touched, the control unit 39 can selects four possible functions "A" to "D" based on an identified key code "1" by S520. In addition, the control unit 39 can select one function based on the flags "q" and "r", and perform the function selected.

When the flags combination is (q, r)=(1, 0), the control unit 39 selects and performs the function "A". When the flags combination is (q, r)=(0, 1), the control unit 39 selects and performs the function "B". When the flags combination is (q, r)=(1, 1), the control unit 39 selects and performs the function "C". When the flags combination is (q, r)=(0, 0), the control unit 39 selects and performs the function "D". Then, the control unit 39 completes the input processing.

The flags combination (q, r)=(1, 0) indicates that the input object is touched with the first ringed finger alone. The flags combination (q, r)=(0, 1) indicates that the input object is touched with the second ringed finger alone. The flags combination (q, r)=(1, 1) indicates that the input object is touched with both the first ringed finger and the second ringed finger simultaneously. The flags combination (q, r)=(0, 0) indicates that the input object is touched with a body part other than the first and second ringed fingers.

According to the embodiment, the electronic device can recognize a plurality of instructions for selecting a function to be performed. The number of recognizable instruction is more than the number of the transmitter modules and up to a square of the number of the transmitter modules.

As a result, a designer can design a multi-functions electronic device with reduced number of input selection member, such as keys on the input device. It is possible to improve operability of the electronic device. In this embodiment, the steps S510-S570 provides the performing module. The performing module (the control unit) 39 selectively performs one function according to a combination of the transmitter modules which are simultaneously detected by the receiving module (the signal detector) 37 as the contact or the proximity at a time of supply of the operation signal from the input device (the touch panel) 33.

Seventh Embodiment

Figure 13:
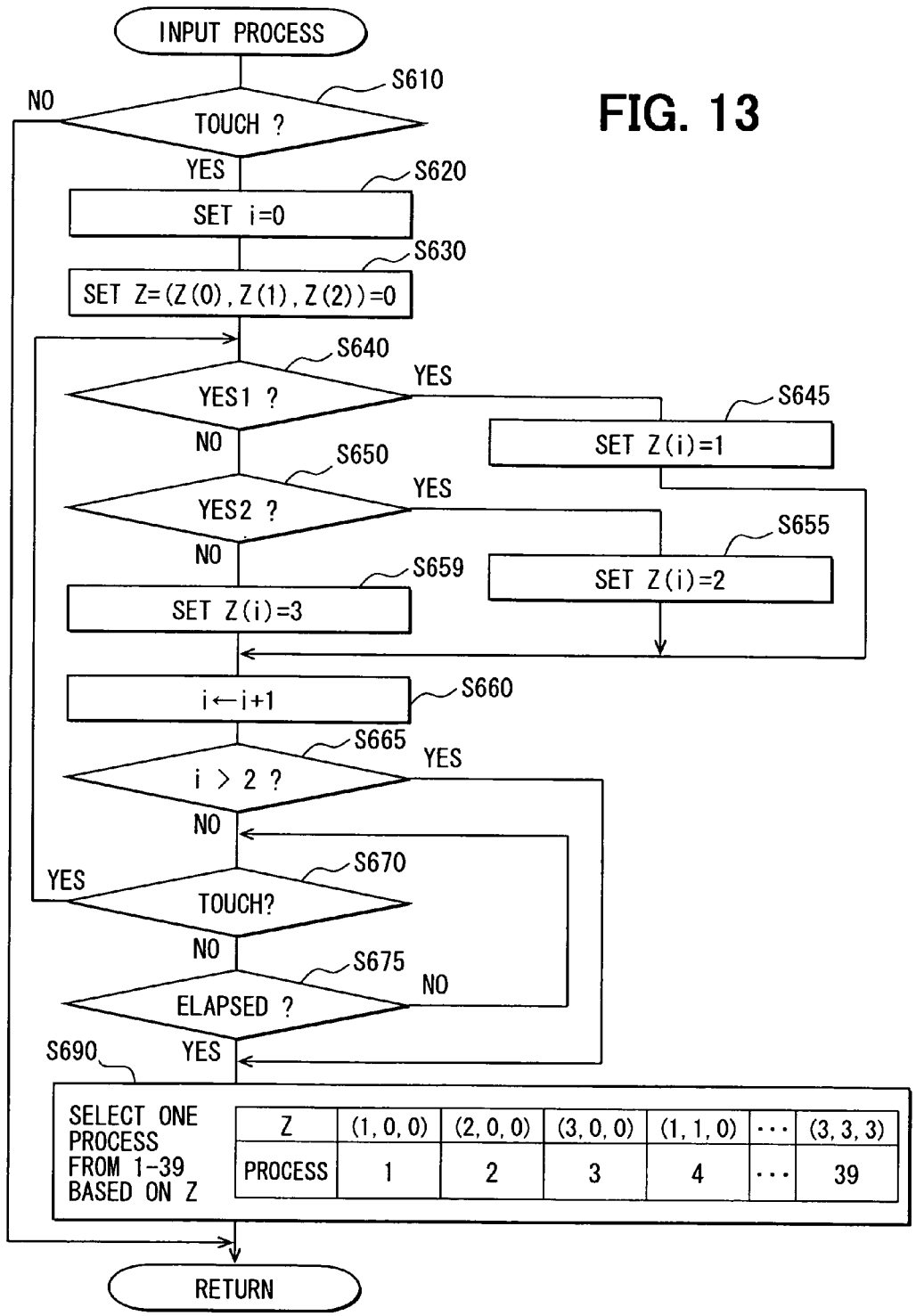
FIG. 13 is a flow chart showing input processing performed by the information processing system according to a seventh embodiment of the present invention.

A seventh embodiment of the present invention is described by referring to FIG. 13. FIG. 13 is a flow chart showing input processing performed by the control unit 39 in the seventh embodiment. In order to increase the number of instructions for determining the function to be performed, the control unit 39 detects an order of touching fingers. Then, the control unit 39 selects and performs the function according to the order of touching fingers. In this embodiment, it is possible to assign more than four functions to one input object, therefore, only one input object is displayed on the display device 35.

In S610, the control unit 39 performs the processing described in S120. If the input object is touched, the routine proceeds to "YES" and proceeds to S620. In S620, the control unit 39 resets a variable "i", i.e., i=0. The variable "i" indicates the number of touching motions which are carried out intermittently. In S630, the control unit 39 resets a variable set Z, i.e., Z=(Z(0),Z(1),Z(2))=(0,0,0). The variable set Z indicates the order of fingers touched the input object.

In S640, the control unit 39 performs the processing described in S550. If the YES1 signal is supplied, the routine proceeds to "YES" from S640. In S645, the control unit 39 sets a value "1" into the variable Z(i). If the YES1 signal is not supplied, the routine proceeds to "NO" from S640. In S650, the control unit 39 performs the processing described in S560. If the YES2 signal is supplied, the routine proceeds to "YES" from S650. In S655, the control unit 39 sets, a value "2" into the variable Z(i). If the YES2 signal is not supplied, the routine proceeds to "NO" from S650. In S655, the control unit 39 sets a value "3" into the variable Z(i).

In S660, the control unit 39 increments the variable "i". In S665, the control unit 39 determines that whether the variable "i" exceeds a predetermined threshold value "2". That is, it is determined that whether the number of touching times is three or more values. If the variable "i" is greater than "2", the routine proceeds to S690. If the variable "i" is not greater than "2", the routine proceeds to a loop of S670 and S675.

During repeating the loop, if a touching motion is detected again, then, the routine returns to S540 from S670. During repeating the loop, if a predetermined time has elapsed without touching motion, the routine proceeds to S690 from S675. The steps S640-675 provide an order detecting module which detects an order of touching fingers. As a result, the electronic device 30 can recognize a plurality of operating conditions which is more than the number of the transmitter modules.

In S690, the control unit 39 selects one process from a plurality of predetermined processes "1" to "39" based the order of touching fingers indicated by the variable set Z. In addition, the control unit 39 performs the process, i.e., function, which is selected. A concordance between the value of Z and the processes is defined by a table stored in the control unit 39. The table is shown in S690.

As a result, in S690, the control unit 39 selectively performs one function which is one of a plurality of functions assigned to an input object and is selected according to an order of the fingers touched on the touch panel 33. Then, the apparatus completes the input processing.

The variable set Z can take 39 cases which correspond to the number of recognizable instructions for selecting functions. In a case that two transmitter modules are used, and only one touching motion is allowed, there may be three cases. In detail, the first case is that the first ringed finger is used, the second case is that the second ringed finger is used, and the third case is that a body parts other than the ringed finger is used.

In a case that only two touching motions are allowed, there may be nine cases. In addition, in a case that three touching motions are allowed, there may be 27 cases. Therefore, the electronic device 30 in this embodiment can recognize up to 39 cases. It is possible to enable a user to select many different functions by just operating a single input object. In this embodiment, the steps S610-S690 provides the performing module. The performing module (the control unit) 39 selectively performs one function according to a detection order of the transmitter modules which are detected by the receiving module (the signal detector) 37 as the contact or the proximity. The one function is selected from the functions corresponding to the operation signal supplied from the input device (the touch panel) 33.

Eighth Embodiment

Figure 14A:
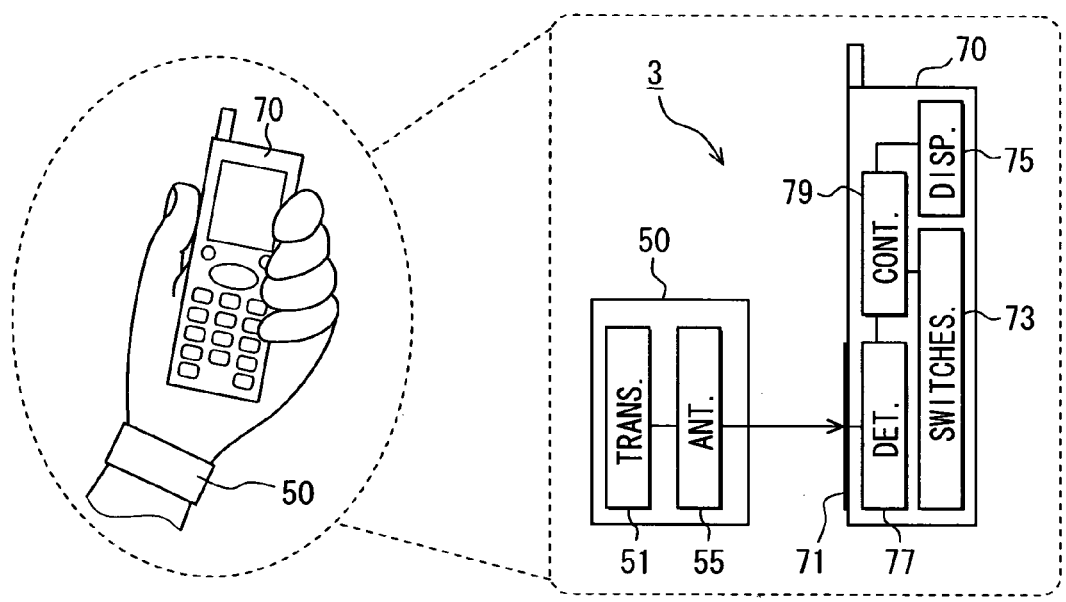
FIG. 14A is a block diagram showing an information processing system including a user interface device according to an eighth embodiment of a present invention.
Figure 14B:
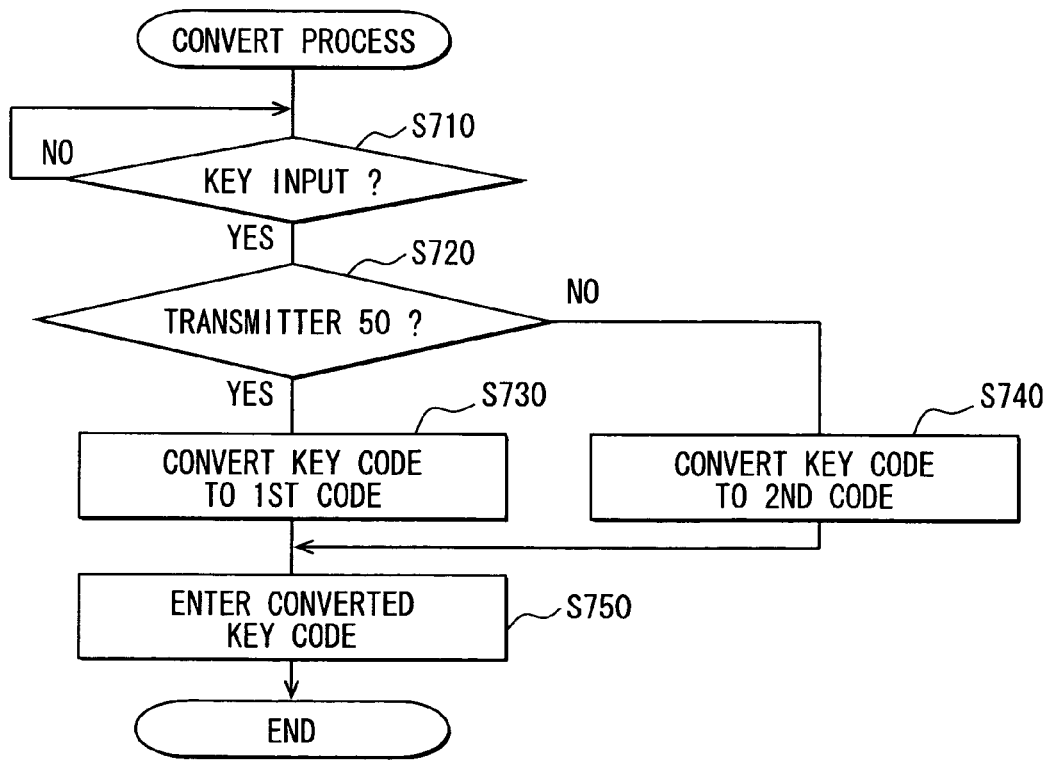
FIG. 14B is a flow chart showing converting processing performed by the information processing system according to the eighth embodiment.

An eighth embodiment of the present invention is described by referring to FIG. 14A and FIG. 14B. FIG. 14A is a block diagram showing an information processing system 3 including a user interface device according to the eighth embodiment. As shown in FIG. 14A, the information process system 3 of this embodiment includes a transmitter module 50 and an electronic device 70. The transmitter module 50 is formed in a bracelet shape. The electronic device 70 is a portable device. The transmitter module 50 is different from the ring 10 only in size. The transmitter module 50 includes similar components to the ring 10. The transmitter module 50 has a transmitter circuit 51 corresponding to the transmitter circuit 11 and an antenna 55 corresponding to the antenna 15. The transmitter module 50 supplies the electric signal to an arm on which the transmitter module 55 is equipped in a similar manner to the first embodiment. A reflector in the antenna 55 is arranged at a root side of the arm. Therefore, the electric signal outputted to a user's body from the transmitter module 50 is transmitted from a wearing part of the transmitter module 50 to a fingertip side of the arm. For example, in a case that the transmitter module 50 is worn on the left arm as shown in FIG. 14A, the electric signal from the transmitter module 50 exclusively transmitted toward the left hand. Therefore, the electric signal never spread toward the right hand.

The electronic device 70 is provided with an electric conductor 71 for receiving the electric signal. The electronic conductor 71 is placed on an outside surface of the electronic device where the left hand palm is come in contact with when a user holds the electronic device 70. The electronic device 70 includes a signal detector 77 which works as the signal detector 37 in the preceding embodiments. The signal detector 77 is connected with the electric conductor 71, and supplies the condition signal to a control unit 79.

The electronic device 70 includes an input device 73. The input device 73 includes a plurality of mechanical operation keys, i.e., switches. The electronic device 70 further includes a display device 75 for a variety-of-information display, and the control unit 79 which controls the display device 75. The control unit 79 selects one of functions according to an instruction from a user, and performs the selected function in response to an operation signal inputted by the input device 73. Then, the control unit 79 displays a result of the function on the display device 75. The instruction is a detection result indicated by the condition signal supplied from the signal detector 77.

The operation signal is a physical key code corresponding to the key on the input device 73. The physical key code is identification information of the key. If one of the keys is pressed by a user, then the input device 73 supplies the physical key code to the control unit 79. The control unit 79 has a function to convert the physical key code into a logic key code according to the condition signal supplied from the signal detector 77. The logic key code in this embodiment is identification information of the key which exists virtually.

In this embodiment, two different logic key codes are assigned to each key which exists physically on the input device 73. If one key is pressed by a user, a physical key code is supplied to the control unit 79. The control unit 79 converts the physical key code into one of the logic key codes according to the condition signal. Then, the control unit 79 supplies the converted logic key code to application software executed in the electronic device 70. As a result, although the electronic device 70 physically has one key, when viewing from the application software, it seems to have two keys.

The control unit 79 converts a physical key code into a logic key code by performing converting processing shown in FIG. 14B. FIG. 14B is a flow chart showing converting processing. At the beginning of the processing, in S710, the control unit 79 waits until a key on the input device 73 is operated.

If one of the keys on the input device 73 is operated, in S720, the control unit 79 determines that whether the key is operated during the electronic device 70 is held by the hand on the arm where the transmitter module 50 is equipped or not based on the condition signal from the signal detector 77. If the condition signal is the YES signal, it is possible to determine that the key is operated during the electronic device 70 is held by the hand on the arm where the transmitter module 50 is equipped. If the condition signal is the NO signal, it is assumed that the key is operated during the electronic device 70 is held by other than the left hand. If the electronic device 70 is held by the left hand, the routine proceeds to "YES" from S720. In S730, the control unit 79 converts the physical key code supplied from the input device 73 into a first logic key code by using a converting table.

The control unit 79 includes a non-volatile memory device which stores the converting table. In the converting table, the first logic key code and a second logic key code are stored corresponding to one physical key code. The memory device may store a first table for converting the physical key code into the first logic key code and a second table for converting the physical key code into the second logic key code.

If the electronic device 70 is not held by the left hand, the routine proceeds to "NO" from S720. In S740, the control unit 79 converts the physical key code supplied from the input device 73 into the second logic key code by using the converting table.

Then, in S750, the control unit 79 supplies the logic key code into the application software, and completes the converting processing. According to this embodiment, the user can input instructions for selecting functions of the electronic device 70 by just changing the holding hand from one to the other one. In other words, it is not necessary to increase the number of operation keys when increasing functions. It is possible to provide a useful user interface device. As a result, it is possible to improve operability of the portable type electronic device 70. The input device including at least one mechanical operable member is provided by the input device 73. The performing module is provided by the control unit 79. In this embodiment, the input device 73 includes at least one mechanical operable member, and supplies the operation signal indicative of the operable member which is actually operated into the performing module. The performing module 79 is configured to be able to perform a plurality of functions corresponding to the operable member on the input device. In response to a supply of the operation signal from the input device caused by operating the operable member, the performing module 79 selectively performs one function according to the detection result of the receiver module. The one function is selected from the functions corresponding to the operable member actually operated.

Ninth Embodiment

Figure 15:
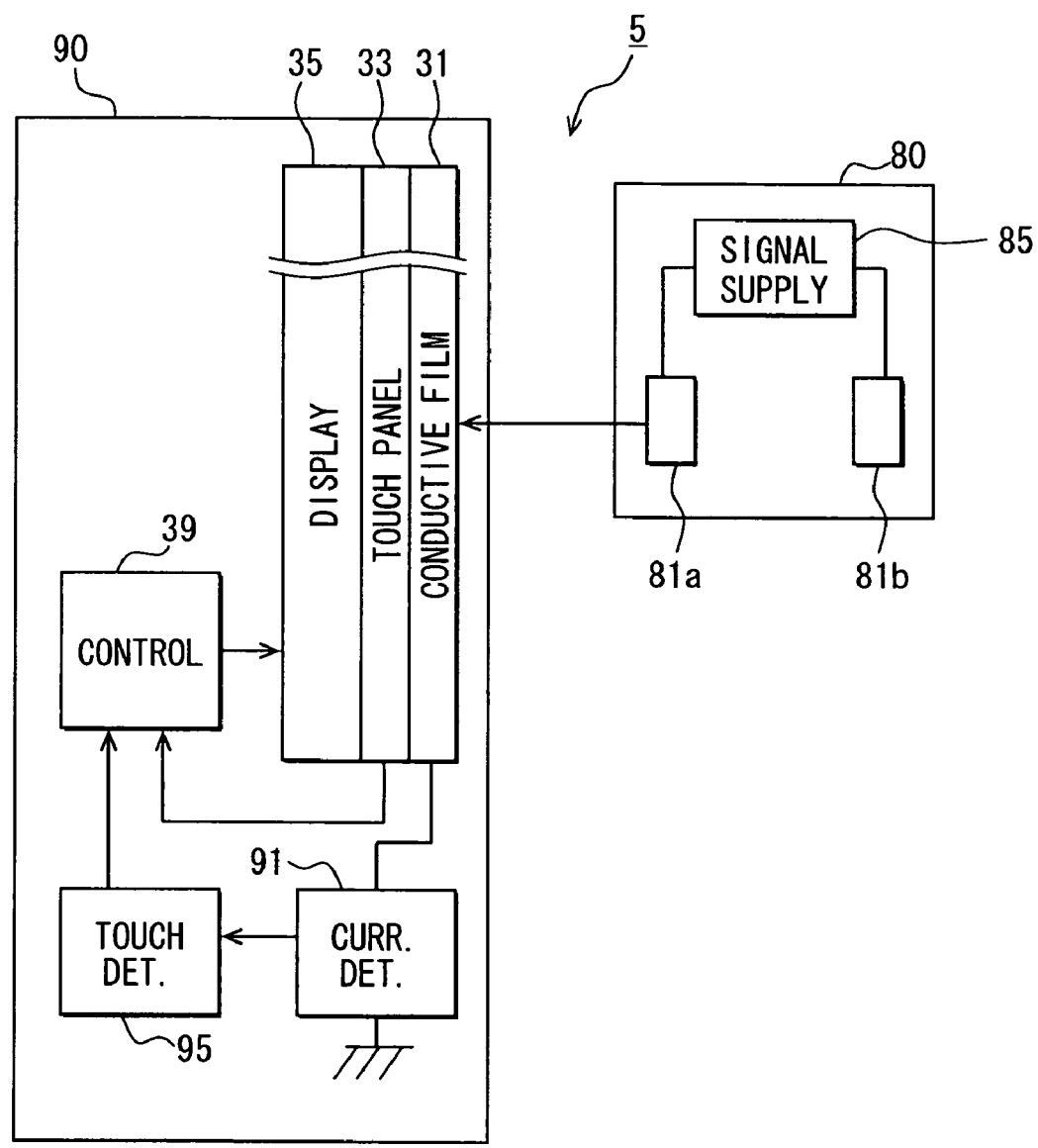
FIG. 15 is a block diagram showing an information processing system including a user interface device according to a ninth embodiment of a present invention.

Alternatively, the transmitter module may outputs and supplies the electric signal to a body part in a current supplying manner. In this case, the information processing system 5 is configured as shown in FIG. 15. The information processing system 5 includes a transmitter module 80 and an electronic device 90. The transmitter module 80 includes a pair of electrodes 81a and 81b, and a signal supply circuit 85. The electrodes 81a and 81b are disposed to supply electric current to a body part of a user-who wears the transmitter module 80. The signal supply circuit 85 is connected between the electrodes 81a and 81b and applies an electric signal between the electrode 81a and 81b. The electronic device 90 includes a current detector 91 and a touch detector 95 which replace the signal detector 37 in the electronic device 30 in the first embodiment. The remaining components are the same in the first embodiment. The current detector 91 is connected with the conductive film 31, and measures a current of the electric signal supplied through the conductive film. The current detector 91 supplies a measured current value to the touch detector 95. The touch detector 95 determines that whether a finger equipped with the transmitter module 80 is come into contact with the conductive film 31 or not based on the measured current value supplied from the current detector 91. The touch detector 95 supplies the detection result to the control unit 39.

Figure 16A:
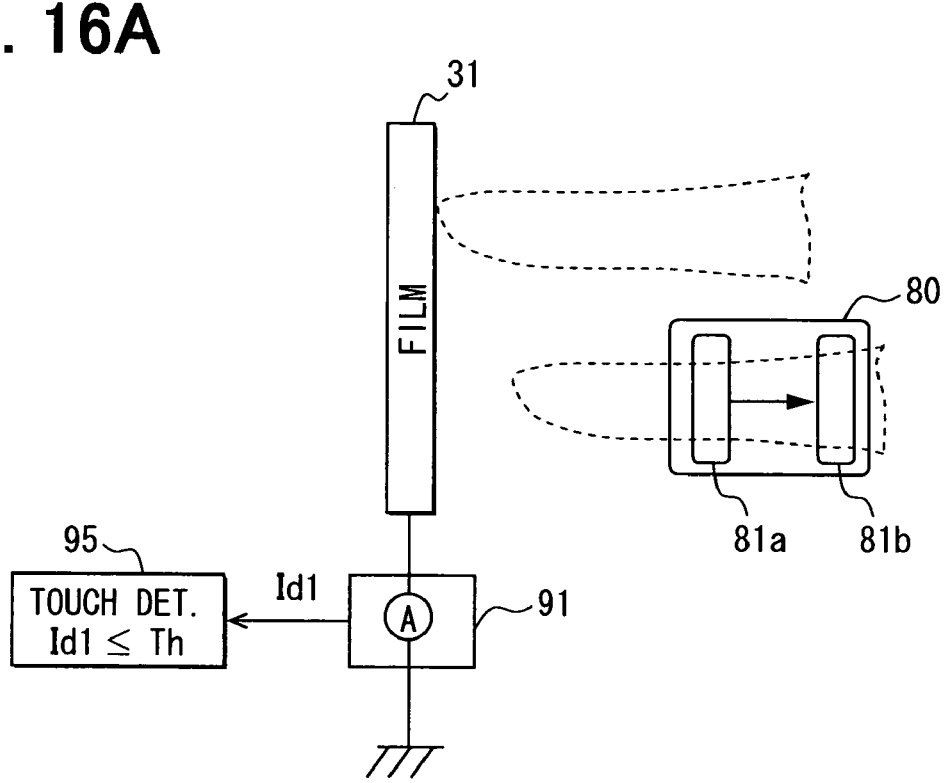
FIG. 16A is a block diagram showing components for detecting a signal from the transmitter module.
Figure 16B:
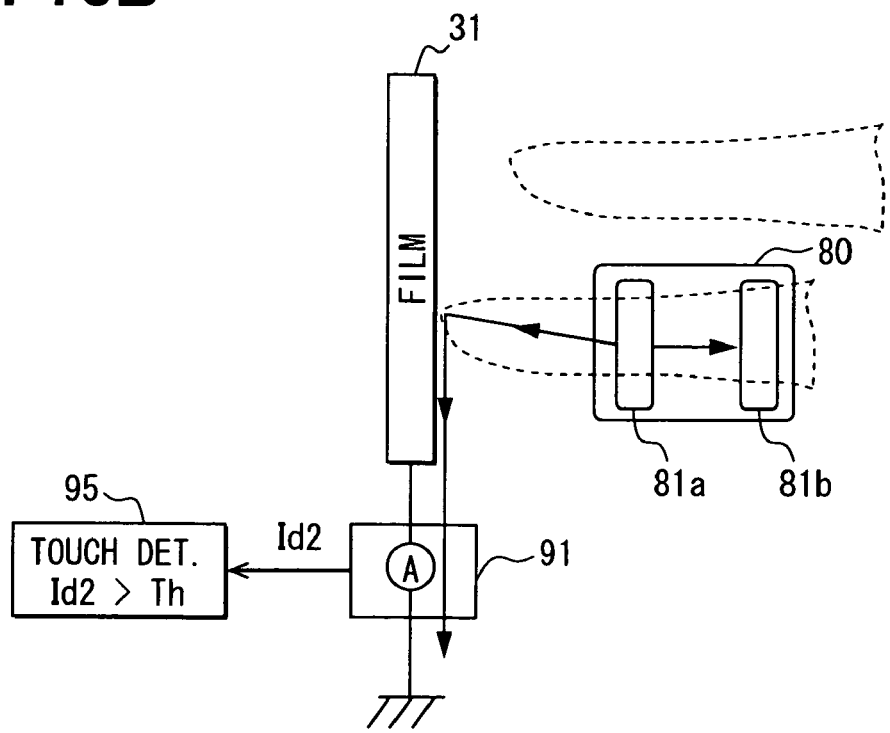
FIG. 16B is a block diagram showing components for detecting a signal from the transmitter module.

FIG. 16A is a block diagrams showing components for detecting a signal from the transmitter module 80. FIG. 16B is a block diagram showing components for detecting a signal from the transmitter module 80. As shown in FIG. 16A, when the body part on which the transmitter module 80 is equipped is placed away from the conductive film 31, it is impossible to conduct the electric signal from the transmitter module 80 to the conductive film 31 through the body part, therefore, the current detector 91 detects a current value of substantially zero.

Contrary, as shown in FIG. 16B, when the body part on which the transmitter module 80 is equipped comes in contact with the conductive film 31, the electric signal from the transmitter module 80 flows to the current detector 91 connected to the ground level, therefore, the current detector 91 detects certain value of current.

The touch detector 95 compares a current value measured by the current detector 91 and the predetermined threshold value. When the current detector 91 detects a current greater than a predetermined threshold value, the touch detector 95 determines that the body part with the transmitter module 80 comes in contact with the conductive film 31, and supplies a YES signal as the condition signal. When the current detector 91 detects a current not greater than a predetermined threshold value, the touch detector 95 determines that the body part with the transmitter module 80 is kept away from the conductive film 31, and supplies a NO signal as the condition signal. The YES signal and the NO signal from the touch detector 95 correspond to the YES signal and the NO signal from the signal detector 37 in the preceding embodiments. The control unit 39 in the electronic device 90 performs the same processing based on the condition signal from the touch detector 95.

Other Embodiment

The present invention can be practiced by the following modified form. Although the first embodiment uses the touch panel 33 as the input device, it is possible to use a mechanical switch as the input device. For example, the input device may be provided by a rotary device. The rotary device may be a rotary knob for volume control of an audio device. In this case, a knob is formed by a conductive member which can receive the electric signal from the transmitter module 10. Alternatively, the knob may be covered with a conductive film which can receive the electric signal from the transmitter module 10. The audio device includes a module for selecting and switching functions according to whether the electric signal is received through the knob or not. In this case, a rotary input device, such as an encoder or a variable resistor, inputs an adjusting signal as the operation signal. The conductive member or the conductive film detects the electric signal from the transmitter module. The module selects and switches input functions for the adjusting signal according to the detection result of the electric signal. For example, if the electric signal is detected, the module performs a first input function in which the adjusting signal from the knob is inputted as a volume adjusting signal. On the other hand, if the electric signal is not detected, the module performs a second input function in which the adjusting signal from the knob is inputted as a frequency tuning signal for a radio receiver. The first function and the second function are selected and switched according to the detection result of the electric signal. As a result, it is possible to use the knob as a volume adjusting purpose and a frequency tuning purpose in a selectable manner. Therefore, it is possible to simplify an interface. It is possible to reduce the number of components necessary for the audio device.

In the above embodiments, two detecting methods for detecting a contact or proximity of a body part with a transmitter module are explained. However, it is possible to employ other known remote detecting methods to practice the present invention in a modified embodiment.

In addition, in a case of the first through eighth embodiments which uses an electric field type detecting system, the conductive film 31 may be disposed between the touch panel 33 and the display device 35 because it is possible to detect proximity of a finger with the transmitter module by a capacitive coupling even if the finger does not come in direct contact with the conductive film 31.

Although the present invention has been fully described in connection with the preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. An electric apparatus operable by a user, who wears a signal transmitter module attached to a limb of the user and supplying an electric signal via an attached part of the signal transmitter module, the electric apparatus comprising:

a detecting device including an electric conductor for receiving, by a direct contact or an electric coupling with the user, the electric signal output from the signal transmitter module, and detecting a contact or proximity of the electric conductor with a body part of the user corresponding to the attached part of the signal transmitter module based on the electric signal received by the electric conductor;

an input device operable by the user and responding to an operation different from an operation of the detecting device caused by the signal transmitter module so that the input device inputs an operation signal corresponding to a user operation, the input device being independent from the detecting device; and a performing module performing a plurality of functions corresponding to the operation signal supplied from the input device, wherein the performing module is configured to be able to perform the plurality of functions corresponding to the operation signal supplied from the input device, and selectively performs the plurality of functions according to a detection result of the detecting device, wherein the input device includes one or more mechanical operable members;

wherein the input device is an input device for supplying the operation signal indicative of one mechanical operable member, which is actually operated, into the performing module as the operation signal;

wherein the performing module is configured to be able to perform the plurality of functions corresponding to each mechanical operable member on the input device; and wherein, when the input device supplies the operation signal in response to an operation of the mechanical operable member, the performing module selectively performs one function according to the detection result of the detecting device, the one function being selected from the plurality of functions corresponding to the mechanical operable member actually operated.

2. The electric apparatus in claim 1, wherein the input device detects a touching motion of the user to a touch surface, and supplies coordinates of a position, where the touching motion is detected on the touch surface, into the performing module as the operation signal;

wherein the performing module is configured to be able to perform the plurality of functions corresponding to the coordinates of the position supplied from the input device; and wherein, when the input device supplies the coordinates of the position by detecting the touching motion, the performing module selectively performs one function according to the detection result of the detecting device, the one function being selected from the plurality of functions corresponding to the coordinates of the position.

3. The electric apparatus in claim 2, wherein the electric conductor of the detecting device is provided as a conductive film placed on the touch surface.

4. The electric apparatus in claim 1, further comprising:

a display device, wherein the performing module changes operation screen images displayed on the display device according to the detection result of the detecting device, and wherein the performing module selectively performs the plurality of functions, respectively, according to the detection result of the detecting device by performing one function corresponding to user's operation information which is indicated by the operation screen image displayed on the display device and is determined based on the operation signal supplied from the input device.

5. The electric apparatus in claim 1, wherein the electric conductor of the detecting device is provided as a conductive film placed on a surface of the input device.

6. The electric apparatus in claim 1, wherein the electric apparatus is operable by the user, who wears a plurality of signal transmitter modules;

wherein each signal transmitter module transmits a unique electric signal;

wherein the detecting device detects, based on the electric signal received by the electric conductor, a contact or proximity of the electric conductor with one of body parts of the user corresponding to a respective signal transmitter module; and wherein the performing module selectively performs the plurality of functions, respectively, according to the detection result of the detecting device indicative of each one of the signal transmitter modules.

7. The electric apparatus in claim 6, wherein the performing module selectively performs one function according to a detection order of the transmitter modules, of which the contact or the proximity is detected by the detecting device, the one function being selected from the plurality of functions corresponding to the operation signal supplied from the input device.

8. The electric apparatus in claim 6, wherein the performing module selectively performs one function according to a combination of the transmitter modules, of which the contact or the proximity is simultaneously detected by the detecting device at a time of supply of the operation signal from the input device, the one function corresponding to the combination of the transmitter modules, and selected from the plurality of functions corresponding to the operation signal.

9. The electric apparatus in claim 1, further comprising:

wherein a relationship changing device changing a relationship between the function, which should be performed and correspond to the operation signal when the operation signal is supplied from the input device, and the detection result of the detecting device according to an instruction from the user.

10. The electric apparatus in claim 1, wherein the performing module is configured to limit the performance of one or more of the plurality of functions when the detection result of the detecting device indicates no direct contact and no electric coupling with the user, and wherein the performing module is configured to allow the performance of all of the plurality of functions when the detection result of the detecting device indicates direct contact or an electric coupling with the user.

11. The electric apparatus in claim 1, wherein the detecting device is used as an authentication device, such that when the detecting device indicates direct contact or an electric coupling with the user, a subset of restricted functions are allowed to be controlled by the input device, and that when the detecting device indicates no direct contact and no electric coupling with the user, the subset of restricted functions are not allowed to be controlled by the input device.

12. The electric apparatus in claim 10, wherein the detecting device is used as an authentication device, such that when the detecting device indicates direct contact or an electric coupling with the user, a subset of restricted functions are allowed to be controlled by the input device, and that when the detecting device indicates no direct contact and no electric coupling with the user, the subset of restricted functions are not allowed to be controlled by the input device.

* * * * *